US008385959B2

(12) United States Patent
Lee et al.

(10) Patent No.: US 8,385,959 B2
(45) Date of Patent: Feb. 26, 2013

(54) METHOD FOR PERFORMING CARRIER MANAGEMENT PROCEDURE IN A MULTI-CARRIER SUPPORTED WIDEBAND WIRELESS COMMUNICATION SYSTEM AND APPARATUS FOR THE SAME

(75) Inventors: Eun Jong Lee, Anyang-si (KR); Ki Seon Ryu, Anyang-si (KR); In Uk Jung, Anyang-si (KR); Yong Ho Kim, Anyang-si (KR); Young Soo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 394 days.

(21) Appl. No.: 12/843,645

(22) Filed: Jul. 26, 2010

(65) Prior Publication Data

US 2011/0039593 A1 Feb. 17, 2011

Related U.S. Application Data

(60) Provisional application No. 61/229,270, filed on Jul. 28, 2009, provisional application No. 61/232,475, filed on Aug. 10, 2009, provisional application No. 61/237,271, filed on Aug. 26, 2009, provisional application No. 61/250,883, filed on Oct. 13, 2009, provisional application No. 61/260,395, filed on Nov. 11, 2009, provisional application No. 61/265,764, filed on Dec. 2, 2009, provisional application No. 61/286,767, filed on Dec. 15, 2009.

(30) Foreign Application Priority Data

Mar. 29, 2010 (KR) ........................ 10-2010-0027900

(51) Int. Cl.
*H04B 7/00* (2006.01)
(52) U.S. Cl. ........ 455/509; 455/515; 455/436; 455/439; 455/456.2; 370/328; 370/329; 370/335; 370/331

(58) Field of Classification Search .................. 455/436, 455/442, 450, 420, 456.2, 509, 515, 69, 522; 370/328, 329, 335, 346, 349, 331
See application file for complete search history.

(56) References Cited

U.S. PATENT DOCUMENTS

| | | | |
|---|---|---|---|
| 2008/0159248 A1 | 7/2008 | Li | |
| 2008/0207137 A1* | 8/2008 | Maharajh et al. | 455/74 |
| 2009/0141678 A1 | 6/2009 | Sun et al. | |
| 2009/0257387 A1* | 10/2009 | Gholmieh et al. | 370/329 |
| 2010/0272067 A1* | 10/2010 | Lu et al. | 370/331 |
| 2011/0069668 A1* | 3/2011 | Chion et al. | 370/329 |
| 2011/0116467 A1* | 5/2011 | Jung et al. | 370/329 |
| 2011/0211533 A1* | 9/2011 | Casaccia et al. | 370/328 |

FOREIGN PATENT DOCUMENTS

WO  WO 2006/107965 A1  10/2006

* cited by examiner

*Primary Examiner* — Tan Trinh

(74) *Attorney, Agent, or Firm* — Birch, Stewart, Kolasch & Birch, LLP

(57) ABSTRACT

A method and apparatus for performing a carrier management in a broadband wireless communication system supporting multi-carriers are disclosed. A method for a mobile station to perform a carrier management procedure with a base station supporting multiple carriers includes receiving a carrier management command message including an action code indicating a primary carrier change and an action time, on a serving primary carrier, transmitting an acknowledgement message indicating that the carrier management command message is successfully received in the mobile station, on the serving primary carrier, and switching the primary carrier to a target carrier indicated by the carrier management command message at the action time, wherein the action time is set to a value more than a retransmission timer, the retransmission timer is set to a time during which the base station waits for receiving the acknowledgement message in response to the carrier management command message.

24 Claims, 18 Drawing Sheets (a)

(b)

(a)

(b)

(a)

(b)

METHOD FOR PERFORMING CARRIER MANAGEMENT PROCEDURE IN A MULTI-CARRIER SUPPORTED WIDEBAND WIRELESS COMMUNICATION SYSTEM AND APPARATUS FOR THE SAME

This application claims the benefit of U.S. Provisional Patent Application Nos. 61/229,270, filed on Jul. 28, 2009, 61/232,475, filed on Aug. 10, 2009, 61/237,271, filed on Aug. 26, 2009, 61/250,883, filed on Oct. 13, 2009, 61/260,395, filed on Nov. 11, 2009, 61/265,764, filed on Dec. 2, 2009, 61/286,767, filed on Dec. 15, 2009, and Korean Patent Application No. 10-2010-0027900, filed on Mar. 29, 2010, all of which are hereby incorporated by reference into the present application.

BACKGROUND OF THE INVENTION

1. Field of the Invention

The present invention relates to a broadband mobile communication system, and more particularly to a method and apparatus for performing a carrier management procedure in a broadband wireless communication system supporting multiple carriers.

2. Discussion of the Related Art

A base station (BS) for use in a conventional wireless communication system includes a single PHY (physical layer) entity capable of supporting a single frequency channel (or a single carrier), and a single Medium Access Control (MAC) controller for controlling the single PHY entity may be provided to the base station (BS). In addition, a plurality of MAC-PHY entities may be present in a single cell. A mobile station (MS) that is capable of exchanging data with the base station (BS) by a single MAC-PHY entity during a certain transmission time interval (TTI), may be referred to as a single-carrier supported MS.

In recent times, a multi-carrier supported wireless communication system such as a multi-carrier aggregation has been proposed to allow the MS to exchange data with the BS through a plurality of carriers.

Multi-carrier aggregation technology achieves data communication between a mobile station (MS) and a base station (BS) through a plurality of aggregations of bandwidth-based carriers that are defined in a conventional wireless communication system (IEEE 802.16e in an IEEE 802.16m system or a Long Term Evolution (LTE) in a Long Term Evolution-Advanced (LTE-A) system). FIGS. 1(a) and 1(b) illustrate contiguous carrier aggregation and non-contiguous carrier aggregation, respectively.

In a multi-carrier supported system, a plurality of frequency channels may be controlled by a single common MAC as necessary. If the frequency channels are controlled by the single common MAC, some MAC messages transmitted via a single carrier can also be applied to other carriers.

Carriers associated with operations of a multi-carrier mode may be classified into a primary carrier and a secondary carrier. The primary carrier may allow the base station (BS) to exchange traffic and PHY/MAC control signaling (e.g., MAC control message) with the mobile station (MS). Although the multi-carrier supported MS is used, it can be defined that the multi-carrier supported MS has only one primary carrier as necessary. The secondary carrier is an additional carrier used by the mobile station (MS) for traffic, and may be used according to a specific command by the base station (BS) and rules that are received through the primary carrier.

MAC control messages for carrier management may be defined. For example, an Advanced Air Interface Carrier Management Command (AAI_CM-CMD) message and an Advanced Air Interface Carrier Management Indication (AAI_CM-IND) message are defined in an IEEE 802.16m standard specification. By the AAI_CM-CMD message received from the base station (BS), primary carrier change, secondary carrier management (secondary carrier activation and/or deactivation), and carrier switching may be performed. The AAI_CM-IND message is a MAC control message used as a response to the AAI_CM-CMD message, and is transmitted from the mobile station (MS) to the base station (BS).

SUMMARY OF THE INVENTION

Accordingly, the present invention is directed to a method for performing a carrier management procedure in a multi-carrier supported broadband wireless communication system and an apparatus for the same, that substantially obviate one or more problems due to limitations and disadvantages of the related art.

Assuming that an unexpected fault occurs in a carrier management procedure, such as carrier change or carrier activation and/or deactivation, for use in a multi-carrier supported system, the fault may negatively affect communication between the mobile station (MS) and the base station (BS). Occasionally, it may be impossible to achieve communication between the mobile station (MS) and the base station (BS).

Therefore, in the carrier management procedure, a carrier management command and an acknowledgement response to the carrier management command should be certainly operated, and carrier activation and/or deactivation caused by the carrier management command should be achieved at correct time point(s).

In addition, considering that a plurality of carriers is controlled by a common MAC in a multi-carrier supported system, it is necessary to devise a new method for allowing a single-carrier supported MS to more effectively perform a carrier change operation.

An object of the present invention is to provide a method for effectively transmitting a carrier management message and a method for effectively performing carrier management in a carrier management procedure of a multi-carrier supported wireless communication system.

Another object of the present invention is to provide an effective carrier change method of a single-carrier supported mobile station (MS) for use in a multi-carrier supported wireless communication system.

The object of the present invention can be achieved by providing a method for a mobile station to perform a carrier management procedure with a base station supporting multiple carriers, the method comprising receiving a carrier management command message including an action code indicating a primary carrier change and an action time, on a serving primary carrier of the base station, transmitting an acknowledgement message indicating that the carrier management command message is successfully received in the mobile station, on the serving primary carrier of the base station, and switching the primary carrier to a target carrier indicated by the carrier management command message at the action time, wherein the action time is set to a value more than a retransmission timer, the retransmission timer is set to a time during which the base station waits for receiving the acknowledgement message in response to the carrier management command message.

The method further comprises disconnecting communication of a control signal on the serving primary carrier at the action time.

In another aspect of the present invention, provided herein is a method for a mobile station to perform a carrier management procedure with a base station supporting multiple carriers, the method comprising receiving a carrier management command message including an action code indicating secondary carrier management and an indication type indicating deactivation from the base station, transmitting a response message in response to the carrier management command message to the base station, and deactivating at least one target carrier specified to be deactivated by the carrier management command message, at a disconnection time decided by the carrier management command message.

The carrier management command message includes a disconnection time at which the at least one target carrier is deactivated.

When the indication type additionally indicates activation of carriers other than the at least one target carrier, the carrier management command message includes a disconnection time defining a time point at which the at least one target carrier is deactivated, and wherein the response message in response to the carrier management command message is a carrier management indication message transmitted to the base station when data transmission/reception through the activated carrier is ready.

The carrier management command message further includes a disconnection time flag indicating whether a disconnection time is set, the disconnection time defining a time point at which the at least one target carrier is deactivated.

The disconnection time flag is configured to set the disconnection time when the indication type further indicates activation of carriers other than the at least one target carrier.

The disconnection time is provided as the same value to the at least one target carrier.

The disconnection time is provided to each of the at least one target carrier.

The disconnection time is determined to be a time point at which the carrier management command message is received.

In another aspect of the present invention, provided herein is a method for a base station supporting multiple carriers to perform a carrier management procedure with a mobile station, the method comprising transmitting a carrier management command message including an action code indicating a primary carrier change and an action time, to the mobile station on a serving primary carrier, receiving an acknowledgement message indicating that the carrier management command message is successfully received in the mobile station, from the mobile station on the serving primary carrier, and switching the primary carrier to a target carrier indicated by the carrier management command message at the action time, wherein the action time is set to a value more than a retransmission timer, the retransmission timer is set to a time during which the base station waits for receiving the acknowledgement message in response to the carrier management command message.

The method further comprises disconnecting communication of a control signal on the serving primary carrier at the action time.

In another aspect of the present invention, provided herein is a method for a base station supporting multiple carriers to perform a carrier management procedure with a mobile station, the method comprising transmitting a carrier management command message including an action code indicating secondary carrier management and an indication type indicating deactivation, to the mobile station, and receiving a response message in response to the carrier management command message from the mobile station, wherein at least one target carrier specified to be deactivated by the carrier management command message is deactivated at a disconnection time decided by the carrier management command message.

The carrier management command message includes a disconnection time at which the at least one target carrier is deactivated.

When the indication type additionally indicates activation of carriers other than the at least one target carrier, the carrier management command message includes a disconnection time defining a time point at which the at least one target carrier is deactivated, and wherein the response message in response to the carrier management command message is a carrier management indication message received from the mobile station when data transmission/reception through the activated carrier is ready.

The carrier management command message further includes a disconnection time flag indicating whether a disconnection time is set, the disconnection time defining a time point at which the at least one target carrier is deactivated.

The disconnection time flag is configured to set the disconnection time when the indication type further indicates activation of carriers other than the at least one target carrier.

The disconnection time is provided as the same value to the at least one target carrier.

The disconnection time is provided to each of the at least one target carrier.

The disconnection time is determined to be a time point at which the carrier management command message is received by the mobile terminal.

In another aspect of the present invention, provided herein is a mobile station for performing a carrier management procedure with a base station supporting multiple carriers, the mobile station comprising a reception module for receiving a downlink control signal and downlink data from the base station, a transmission module for transmitting a uplink control signal and uplink data to the base station, and a processor connected to the reception module and the transmission module for controlling the mobile station including the reception module and the transmission module, wherein the processor is configured to control the reception module to receive a carrier management command message including an action code indicating a primary carrier change and an action time, from the base station on a serving primary carrier, control the transmission module to transmit an acknowledgement message indicating that the carrier management command message is successfully received in the mobile station, on the serving primary carrier of the base station, and control the mobile station to switch the primary carrier to the target carrier at the action time, wherein the action time is set to a value more than a retransmission timer, the retransmission timer is set to a time during which the base station waits for receiving the acknowledgement message in response to the carrier management command message.

In another aspect of the present invention, provided herein is a base station supporting multiple carriers to perform a carrier management procedure with a mobile station, the base station comprising a reception module for receiving a uplink control signal and uplink data from the mobile station, a transmission module for transmitting a downlink control signal and downlink data to the mobile station, and a processor connected to the reception module and the transmission module for controlling the base station including the reception module and the transmission module, wherein the processor is configured to control the transmission module to transmit carrier management command message including an action code indicating a primary carrier change and an action time, to the mobile station on a serving primary carrier, control the reception module to receive an acknowledgement message indicating that the carrier management command message is successfully received in the mobile station, from the mobile station on the serving primary carrier, and wherein the primary carrier is switched to a target carrier indicated by the carrier management command message at the action time, wherein the action time is set to a value more than a retransmission timer, the retransmission timer is set to a time during which the base station waits for receiving the acknowledgement message in response to the carrier management command message.

In another aspect of the present invention, provided herein is a mobile station for performing a carrier management procedure with a base station supporting multiple carriers, the mobile station comprising a reception module for receiving a downlink control signal and downlink data from the base station, a transmission module for transmitting a uplink control signal and uplink data to the base station, and a processor connected to the reception module and the transmission module for controlling the mobile station including the reception module and the transmission module, wherein the processor is configured to control the reception module to receive a carrier management command message including an action code indicating secondary carrier management and an indication type indicating deactivation, from the base station, control the transmission module to transmit a response message in response to the carrier management command message to the base station, and control the mobile terminal to deactivate at least one target carrier specified to be deactivated by the carrier management command message, at a disconnection time decided by the carrier management command message.

In another aspect of the present invention, provided herein is a base station supporting multiple carriers to perform a carrier management procedure with a mobile station, the base station comprising a reception module for receiving a uplink control signal and uplink data from the mobile station, a transmission module for transmitting a downlink control signal and downlink data to the mobile station, and a processor connected to the reception module and the transmission module for controlling the base station including the reception module and the transmission module, wherein the processor is configured to control the transmission module to transmit a carrier management command message including an action code indicating secondary carrier management and an indication type indicating deactivation, to the mobile station, and control the reception module to receive a response message in response to the carrier management command message from the mobile station, wherein at least one target carrier specified to be deactivated by the carrier management command message is deactivated at a disconnection time decided by the carrier management command message.

The exemplary embodiments of the present invention have the following effects.

In association with a carrier management procedure for use in a multi-carrier supported wireless communication system, the embodiment of the present invention provides a method for effectively transmitting a carrier management message and a method for effectively performing carrier management.

In association with a multi-carrier supported wireless communication system, the embodiment of the present invention provides an effective carrier change method of a single carrier supported MS.

It will be appreciated by persons skilled in the art that the effects that can be achieved with the present invention are not limited to what has been particularly described herein above and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention. In the drawings.

DETAILED DESCRIPTION OF THE INVENTION

Figure 1:
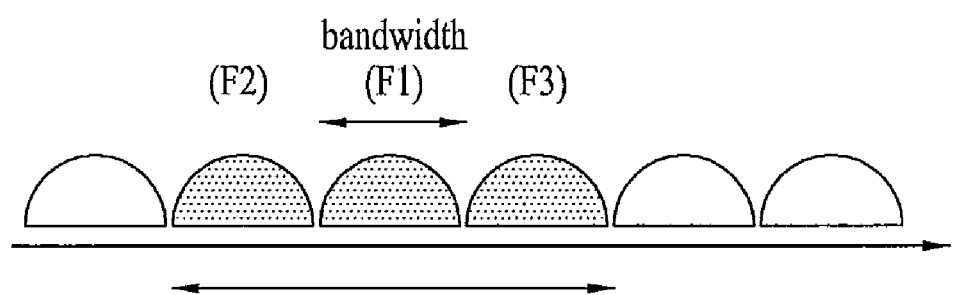
FIGS. 1(a) and 1(b) illustrate contiguous carrier aggregation and non-contiguous carrier aggregation, respectively.
Figure 1:
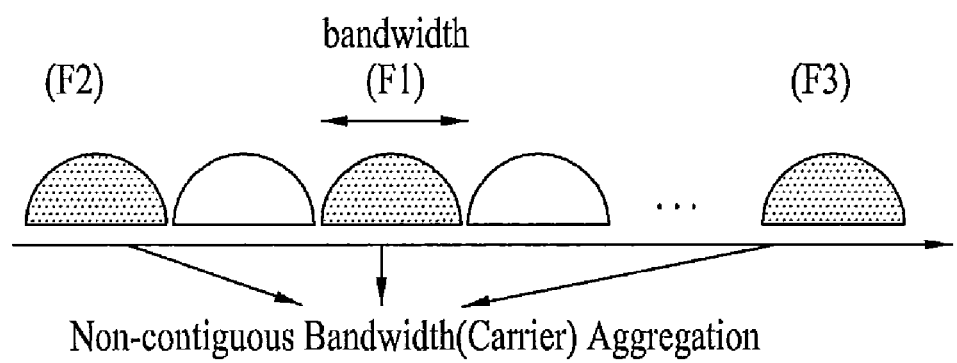

Reference will now be made in detail to the preferred embodiments of the present invention, examples of which are illustrated in the accompanying drawings.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In exemplary embodiments of the present invention, a description is made of a data transmission and reception relationship between a Base Station (BS) and a Mobile Station (MS). Herein, the term 'BS' refers to a terminal node of a network, which directly communicates with the MS. In some cases, a specific operation described as performed by the BS may be performed by an upper node of the BS.

Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'eNode B (eNB)', 'access point', or 'Advanced Base Station (ABS) that is supported by an IEEE 802.6m system, etc. In addition, the term 'relay' may be replaced with a Relay Node (RN), a Relay Station (RS) or the like. The term 'MS' may be replaced with the term 'User Equipment (UE)', Subscriber Station (SS), 'Mobile Subscriber Station (MSS)', 'mobile terminal', or 'Advanced Mobile Station (AMS)' that is supported by an IEEE 802.16m system, etc.

Specific terms used for the exemplary embodiments of the present invention are provided to help in understanding of the present invention. These specific terms may be replaced with other terms within the scope and spirit of the present invention.

In some cases, in order to prevent ambiguity of the concepts of the present invention, conventional devices or apparatuses well known to those skilled in the art will be omitted and be denoted in the form of a block diagram on the basis of the important functions of the present invention. Wherever possible, the same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a 3$^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. The CDMA may be embodied with wireless (or radio) technology such as UTRA (Universal Terrestrial Radio Access) or CDMA2000. The TDMA may be embodied with wireless (or radio) technology such as GSM (Global System for Mobile communications)/GPRS (General Packet Radio Service)/EDGE (Enhanced Data Rates for GSM Evolution). The OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE-Advanced (LTE-A) is an evolved version of the 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the IEEE 802.16m. However, technical features of the present invention are not limited thereto.

MAC-PHY Entity and Common MAC

Figure 2:
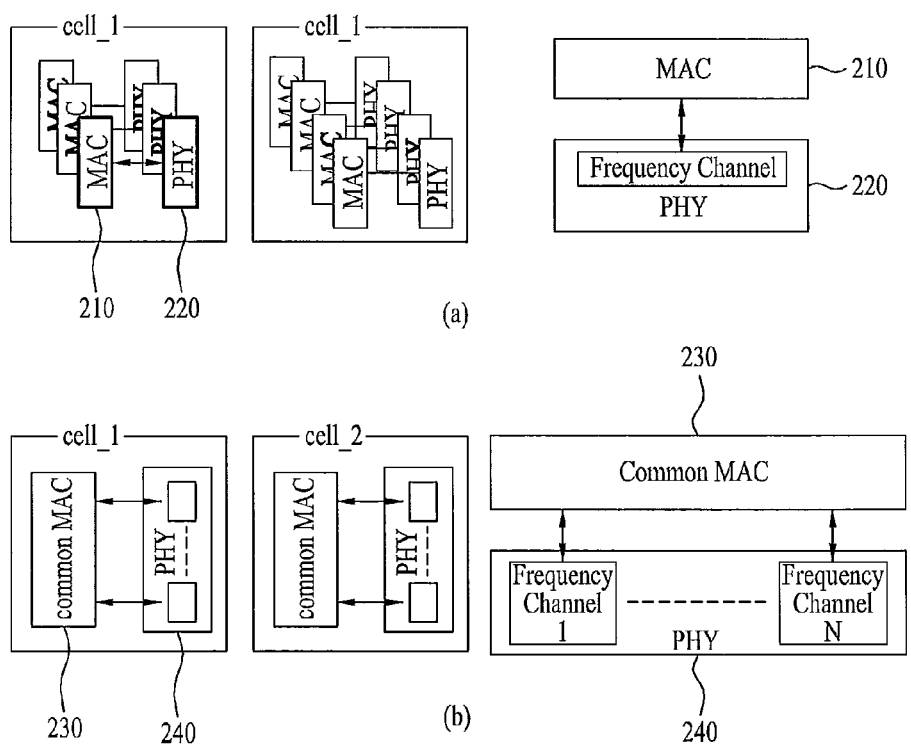
FIGS. 2(a) and 2(b) illustrate a MAC-PHY entity structure and a common MAC, respectively.

A MAC-PHY entity will hereinafter be described with reference to FIGS. 2(a) and 2(b). FIGS. 2(a) and 2(b) illustrate a MAC-PHY entity structure and a common MAC, respectively.

FIG. 2(a) shows a MAC-PHY entity for use in a conventional wireless communication system. A base station (BS) for use in a conventional wireless communication system includes a single PHY entity 220 supporting a single frequency channel, and a single MAC controller 210 for controlling the single PHY entity 220 may be provided to the base station (BS). A plurality of MAC-PHY entities may be present in one cell (cell_1 or cell_2). A mobile station (MS) capable of exchanging data with the base station (BS) through one MAC-PHY entity during a predetermined transmission time interval (TTI) may be referred to as a single-carrier supported mobile station (MS).

FIG. 2(b) shows a MAC-PHY entity for use in a multi-carrier supported wireless communication system. The multi-carrier supported wireless communication system means a wireless communication system for providing a specific technology to the mobile station (MS) such that the mobile station (MS) can exchange data with the base station (BS) simultaneously using a plurality of carriers during an arbitrary TTI. The multi-carrier supported system may allow a plurality of frequency channels to be controlled by a single common MAC. A single MAC entity 230 is present in one cell (cell_1 or cell_2), and each frequency channel of the PHY entity 240 may be controlled by a single common MAC entity 230. That is, the common MAC entity 230 may control the PHY entity 240 having the range of a plurality of frequency channels.

The multi-carrier supported base station (BS) may include not only the conventional MAC-PHY entity supporting a single frequency channel but also a MAC-PHY entity comprised of the above-mentioned common MAC. In addition, each of the common MAC and a MAC may include a single base station identifier (BSID). The operation, in which an MS that is currently receiving a service from a certain MAC changes its own frequency channel to that of another MAC having a different BSID, may be defined as an inter-frequency handover (HO). The other operation, in which a frequency channel of the MS that is currently receiving the service from a certain MAC changes is changed to another frequency channel within the range of one common MAC, may be defined as 'primary carrier change'.

Under the control of a common MAC, some MAC messages transmitted through a single carrier may be applied to other carriers. Some frequency channels may have different bandwidths (e.g., 5 MHz, 10 MHz and 20 MHz), and may be present in contiguous or non-contiguous frequency bands. The frequency channels may have different duplex modes, and each frequency channel may support Frequency Division Duplexing (FDD), Time Division Duplexing (TDD), or a combination mode of two-way and broadcast dedicated carriers. The MAC entity can support the co-existence of mobile stations (MSs) having different capabilities, such that it may be operated by only one channel at one time or may support capabilities such as contiguous/non-contiguous channel aggregation. Therefore, multiple frequency channels can be more easily controlled by the common MAC supporting multi-carrier aggregation.

Multiple carriers contained in the same common MAC can be simultaneously used by a base station (BS) and a mobile station (MS). In order to allow the mobile station (MS) to more effectively use the concept of multiple carriers, the embodiment of the present invention provides a carrier management method (e.g., secondary carrier management, primary carrier change, and carrier switching).

Multi-carrier Types and Operation Modes

From the viewpoint of a mobile station (MS), carriers associated with the multi-carrier mode operation may be classified into a primary carrier and a secondary carrier. The primary carrier refers to a carrier that is used when a base station (BS) exchanges traffic and PHY/MAC control signaling (e.g., MAC control message) with the mobile station (MS). Although multiple carriers may be used in the base station (BS), the mobile station (MS) belonging to the BS has only one primary carrier. In addition, the primary carrier is also used even when the mobile station (MS) is operated in a single carrier mode. Meanwhile, the secondary carrier refers to an additional carrier that is used by the mobile station (MS) for traffic, and may be used according to a specific command by the base station (BS) and rules received through the primary carrier.

In relation to an FDD mode and a TDD mode, a carrier may refer to a downlink or uplink physical frequency channel. The physical carrier indexes may refer to indexes of an available carrier of the base station (BS), and are arranged in ascending numerical order from a low frequency to a high frequency.

During the multi-carrier operation, the common MAC can fully control the mobility, status and context of the MS through the primary carrier, and at the same time can use radio resources of the primary carrier and at least one secondary carrier.

Based on the usages and services of the primary carrier and/or the secondary carrier, carriers of the multi-carrier system can be classified into a fully configured carrier and a partially configured carrier. The fully configured carrier is a standalone carrier, and refers to a carrier in which all control channels including synchronization, broadcast, multicast and unicast control signaling are configured. The fully configured carrier can support not only the single carrier mobile station (MS) but also the multi-carrier mobile station (MS). Meanwhile, the partially configured carrier refers to either a carrier for downlink dedicated transmission in TDD mode or a downlink carrier that is unpaired with an uplink carrier in FDD mode. The secondary carrier may only be used in conjunction with the primary carrier, and cannot be independently operated to provide an Advanced Air Interface (AAI) service to the mobile station (MS). Information indicating whether the carrier is a fully configured carrier or a partially configured carrier is indicated by a preamble of a carrier (i.e., advanced preamble). The mobile station (MS) does not attempt to perform a network entry or a handover (HO) for the partially configured carrier. In the multi-carrier aggregation, an uplink control channel, that is used as a secondary carrier and corresponds to the partially configured carrier, may be located at a control area that is not overlapped with an uplink of the primary carrier. In order to feed back not only information about HARQ ACK/NACK corresponding to transmission through a downlink-dedicated secondary carrier but also channel quality measurement, an uplink control channel on the primary carrier is used.

The secondary carrier may be a fully configured carrier or a partially configured carrier according to the usage plan, whereas the primary carrier is always a the fully configured carrier. Assuming that the secondary carrier for a certain mobile station (MS) is a fully configured carrier, this secondary carrier may be used as a primary carrier of another mobile station (MS) as necessary. Several mobile stations (MSs) having different primary carriers may share the same secondary carrier. In relation to the above description, the multi-carrier operations, such as a multi-carrier aggregation and a multi-carrier switching, etc. may be independently or simultaneously supported.

The multi-carrier aggregation means that the MS maintains the connection to a physical layer, monitors control signaling on the primary carrier, and at the same time processes data on the secondary carrier. Resource allocation for the mobile station (MS) may have the range of the primary carrier and several secondary carriers. The link adaptation feedback mechanism may include measurement of both the primary carrier and the secondary carrier. In a multi-carrier aggregation mode, according to system load (i.e., static/dynamic load balancing), peak data rate, or QoS (Quality of Service) request, a system may asymmetrically allocate a secondary carrier to a mobile station (MS) through a downlink and/or an uplink.

The multi-carrier switching may refer to a multi-carrier mode in which a mobile station (MS) switches the connection to the physical layer from the primary carrier to the secondary carrier upon receiving an indication message from the base station (BS). The mobile station (MS) connects to the secondary carrier during a predetermined time interval, and returns to the primary carrier. Assuming that the mobile station (MS) connects to the secondary carrier, the mobile station (MS) may not maintain transmission/reception through the primary carrier. The above-mentioned mode may be used for the switching to either the partially configured carrier or the fully configured carrier, such that an Enhanced Multicast Broadcast Service (E-MBS) can be received.

The following descriptions may be commonly applied to the multi-carrier mode operations.

A system may define N independent and fully-configured carriers. In each of the N independent and fully-configured carriers, synchronization, broadcast, and multicast and unicast control signaling channels needed to support the single carrier mode MS are configured. Each mobile station (MS) contained in the cell is connected to only one fully configured carrier that is set to the primary carrier, and the status of the mobile station (MS) can be controlled through the primary carrier. In addition, the system may define M partially configured carriers (where $M \geq 0$), and each carrier may be used only as the secondary carrier instead of the primary carrier, and may be used to transmit downlink dedicated data.

Figure 3:
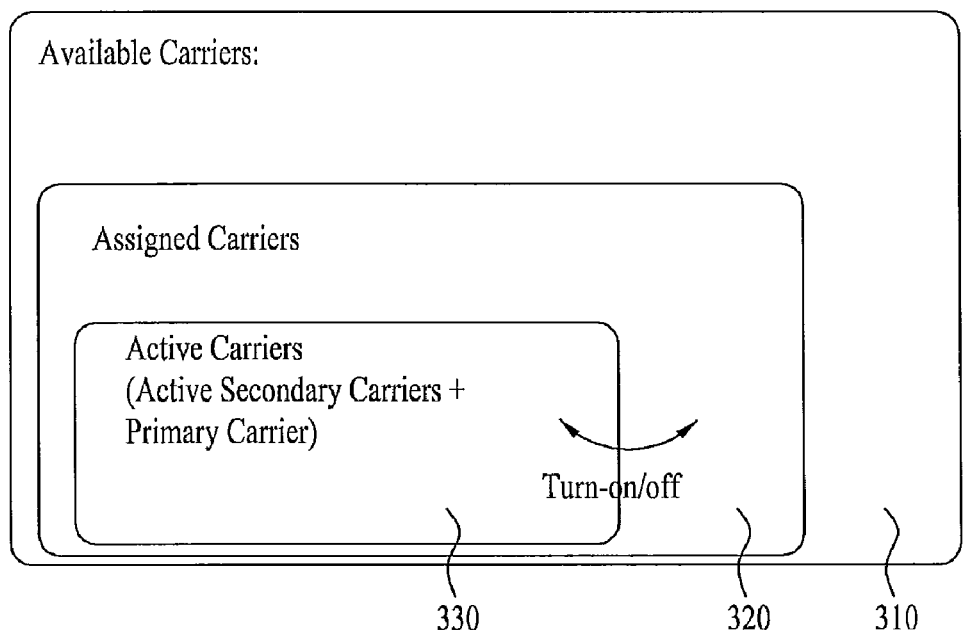
FIG. 3 illustrates the relationship among an available carrier, an assigned carrier, and an active carrier in a multi-carrier system.

FIG. 3 illustrates the relationship among an available carrier, an assigned carrier, and an active carrier in a multi-carrier system. As shown in FIG. 3, the aggregate of all carriers supported by a base station (BS) may be referred to as an available carrier (310). A carrier that is allocated as a partial aggregation of the available carriers to the mobile station (MS) may be referred to as an assigned carrier (320). A carrier that is used as a partial aggregation of the assigned carriers and is ready to be used for multi-carrier allocation may be referred to as an active carrier (330).

The available carriers may be located at different parts of the same spectrum block or at non-contiguous spectrum blocks. The base station (BS) may provide not only information of a primary carrier (i.e., a serving primary carrier) but also a few setup information segments of available carriers through the primary carrier. Through the above-mentioned messaging, the base station (BS) indicates the MS's existence, bandwidth, duplexing, and spectrum positions of all available carriers, such that it enables the mobile station (MS) to prepare for all kinds of multi-carrier operations. In addition, the primary carrier may further provide the extended information about the secondary carrier setup as necessary.

Network Entry

Network entry from among MAC actions related to multi-carrier operations will hereinafter be described in detail.

In the multi-carrier mode, network entry is basically identical to that in single carrier mode. During the registration process of a base station (BS) and a mobile station (MS), the base station (BS) and the mobile station (MS) may display whether or not the multi-carrier mode is supported. The mobile station (MS) can perform network entry (or network re-entry) only through the fully configured carrier. In the case where the mobile station (MS) detects 'A-PREAMBLE' on the fully configured carrier, the mobile station (MS) can read a super-frame header (SFH), an extended system parameter, and system setup information.

During initial network entry, the mobile station (MS) transmits an Advanced Air Interface Registration Request (AAI_REG-REQ) message to the base station (BS) such that the mobile station (MS) informs the base station (BS) that the mobile station (MS) supports multi-carrier transmission. The base station (BS) transmits an AAI registration response (AAI_REQ-RSP) message to the mobile station (MS) such that it can display whether there is a supported mode from among multi-carrier modes associated with the mobile station (MS). The basic multi-carrier capability exchange may use 2-bit codes of the AAI_REQ-REQ/AAI_REQ-RSP messages as shown in the following Table 1.

TABLE 1

| b1, b2 | Multicarrier Capabilities |
| --- | --- |
| 00 | No MC modes |
| 01 | Basic MC mode |
| 10 | Multicarrier Aggregation |
| 11 | Multicarrier Switching |

A basic multi-carrier mode (Basic MC mode) includes a mobile station (MS) operation in which the mobile station (MS) is aware of BS's multi-carrier (MC) operations which include primary carrier change and a support of MC-associated optimization scanning. Supporting both the multi-carrier aggregation and the multi-carrier (MC) switching may not represent the support of an Enhanced Multicast Broadcast Service (E-MBS), and may be separately negotiated as necessary.

The mobile station (MS) initialization procedure for preparing for the subsequent multi-carrier (MC) action after network entry will hereinafter be described. The mobile station (MS) initialization procedure may include an operation for acquiring multi-carrier (MC) setup information about available carriers of the base station (BS) and an operation for acquiring information about assigned carriers. Acquisition of the assigned carrier information may provide the base station (BS) with information about supported carriers of the mobile station (MS) and information about the combined multi-carrier (MC) setup. In the subsequent MC action of the above mobile station (MS), the base station (BS) can acquire information about a partial aggregation (i.e., assigned carrier) of available carriers of the base station (BS).

The mobile station (MS) does not perform the MAC or PHY processing through the assigned carrier before the assigned carrier is activated by a command received from the base station (BS).

Carrier Management

First, activation or deactivation of the secondary carrier will hereinafter be described in detail. Activation or deactivation of the secondary carrier may be determined by a base station (BS) on the basis of a QoS (Quality of Service), load condition of a carrier and other factors. The base station (BS) may activate and/or deactivate the secondary carrier using an AAI Carrier Management Command (AAI_CM-CMD) message. The base station (BS) may transmit the AAI_CM-CMD message through the primary carrier, wherein the AAI_CM-CMD message includes downlink/uplink (DL/UL) indication types (activation and deactivation), list of secondary carriers (logical carrier indexes), and information about a ranging indicator of the activated carrier.

The base station (BS) may set a polling bit of a MAC Control Extended Header (MCEH) of the AAI_CM-CMD message to '1', and transmit the resultant AAI_CM-CMD message. Upon receiving the AAI_CM-CMD message from the base station (BS), the mobile station (MS) transmits an AAI message acknowledgement (AAI_MSG-ACK) message or a Message ACK Extended Header (MAEH) to the base station (BS), such that the mobile station (MS) can inform the base station (BS) of the successful reception of the AAI_CM-CMD message. A detailed description thereof will hereinafter be presented.

The mobile station (MS) transmits the AAI_CM-IND MAC control message to the base station (BS) through the primary carrier, such that the base station (BS) can confirm that the mobile station (MS) has successfully activated/deactivated the carriers listed in the AAI_CM-CMD message. In case of the activation, when DL/UL of a newly activated carrier is ready to be used for data traffic transmission, the mobile station (MS) can transmit the AAI_CM-IND message.

In the case where the mobile station (MS) acting as a single wireless transceiver (also called a single Radio Frequency (RF) transceiver) performs secondary carrier activation when supporting data transmission through both the primary carrier and the secondary carrier, the mobile station (MS) may reset hardware setup (e.g., RF center frequency). After the completion of hardware reset and synchronization on a new carrier, the mobile station (MS) transmits the AAI_CM-IND message to the base station (BS) such that it commands the base station (BS) to prepare for a new carrier and resumes communication with the base station (BS). After the base station (BS) receives the AAI_CM-IND MAC message, the base station (BS) may begin to transmit data on the activated secondary carrier.

Next, the primary carrier change will hereinafter be described in detail. Differently from general inter-FA (inter- Frequency Area) handover, the primary carrier change may include the change of a serving carrier of a mobile station (MS) belonging to the multi-carrier base station (BS) without changing the MAC layer security and the mobility context. The mobile station (MS) recognizing the multi-carrier can support the primary carrier change. For the purpose of load balancing, variable carrier channel quality or other factors, the base station (BS) may command the primary carrier change of the mobile station (MS) through the AAI_CM-CMD MAC control message on a current primary carrier, such that the mobile station (MS) primary carrier is changed to one of the fully configured carriers allocated to the same base station (BS) by the AAI_CM-CMD MAC control message. If the mobile station (MS) receives the AAI_CM-CMD message in which the polling bit of the MCEH is set to '1', the mobile station (MS) may transmit the AAI_MSG-ACK message or the MAEH in response to the AAI_CM-CMD message. The mobile station (MS) severs a control signal on the serving carrier, and then switches to the target fully configured carrier at an action time specified by the base station (BS). The action time defined by the AAI_CM-CMD message may be set to a value that is higher than that of a retransmission timer for the AAI_CM-CMD message. A detailed description thereof will hereinafter be presented.

In the case where the mobile station (MS) supports the carrier aggregation mode and a target carrier is one of the MS's activated secondary carriers, the mobile station (MS) may receive data and control signals on the target carrier immediately after switching. Otherwise, the mobile station (MS) may reconfigure its own hardware (e.g., RF center frequency), and may switch to the target carrier. If the ranging indicator of the AAI_CM-CMD message is set to '1', the mobile station (MS) performs periodic ranging to the target carrier. Upon successful completion of periodic ranging, the mobile station (MS) transmits the AAI_CM-IND message to the base station (BS) so as to inform the base station (BS) of the readiness of the target carrier. Upon receiving the AAI_CM-IND message from the mobile station (MS) through the target primary carrier, the base station (BS) may transmit data and control signals to the mobile station (MS). In the case where the common MAC manages both the serving primary carrier and the target primary carrier, network re-entry is not requested at the target primary carrier. The base station (BS) may command the mobile station (MS) to perform primary carrier change without scanning. In association with the multi-carrier supported MS, upon completion of the primary carrier change, a logical carrier index of the serving primary carrier may be one-to-one exchanged with that of the target primary carrier.

The mobile station (MS) may perform scanning of other assigned carriers that do not serve the mobile station (MS) according to an unsolicited scheme or a base station's indication message. The mobile station (MS) may report the scanning result to the serving base station, and the base station (BS) may use the report result to decide a carrier that is to be switched by the mobile station (MS). In this case, assuming that the target carrier does not serve the current mobile station (MS), the mobile station (MS) may establish synchronization with the target carrier.

The AAI_CM-CMD message for the primary carrier change may be transmitted on the primary carrier, and may include information about a target primary carrier index, an indication for the next status of the serving primary carrier, an action time, and a ranging indicator. At this time, if the mobile station (MS) does not support the carrier aggregation, a field denoted by "Next Status of Serving Primary Carrier" may always be set to zero '0'. The serving primary carrier may be activated or deactivated according to the indication for the next status of the serving primary carrier.

MAC Control Message for Carrier Management

The Advanced Air Interface Carrier Management Command (AAI_CM-CMD) message is transmitted by a base station (BS), and the carrier management procedure, such as the carrier activation/deactivation or the primary carrier change, starts operation. In response to the AAI_CM-CMD MAC control message, the mobile station (MS) may transmit the AAI_CM-IND MAC control message.

The base station (BS) may start operating the retransmission timer after transmitting the AAI_CM-CMD message. If the base station (BS) receives an acknowledgement (ACK) message of the AAI_CM-CMD message before the expiration of the retransmission timer, the base station (BS) may stop operation of the timer and then perform a procedure corresponding to the action code. If the base station (BS) does not receive the acknowledgement (ACK) message before the expiration of the retransmission timer, the base station (BS) may retransmit the AAI_CM-CMD message.

In the case where the AAI_CM-CMD message newly activates the target secondary carrier or indicates the primary carrier change to the deactivated target carrier, the mobile station (MS) transmits the AAI_CM-IND message to the base station (BS) such that it may inform the base station (BS) of the readiness of the target carrier. The AAI_CM-IND message may include the action code about either the secondary carrier management or the primary carrier change.

Acknowledgement of MAC Control Message in Carrier Management Procedure

In a carrier management procedure, a method for transmitting acknowledgement (ACK) messages related to AAI_CM-CMD and AAI_CM-IND messages in accordance with one embodiment of the present invention will hereinafter be described in detail.

In a conventional carrier management procedure, the AAI_CM-CMD message may be used to indicate either the secondary carrier management or the primary carrier change. The AAI_CM-IND message may be used to answer the AAI_CM-IND message. However, the AAI_CM-IND message may be used in different ways according to indicated actions.

Figure 4:
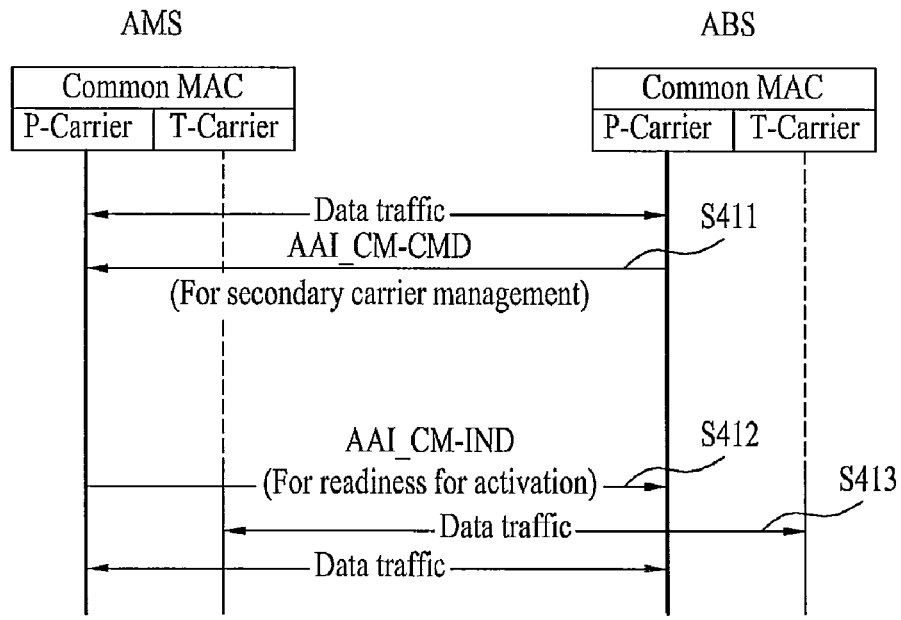
FIGS. 4(a) and 4(b) are flowcharts illustrating message exchange in response to a carrier management procedure.
Figure 4:
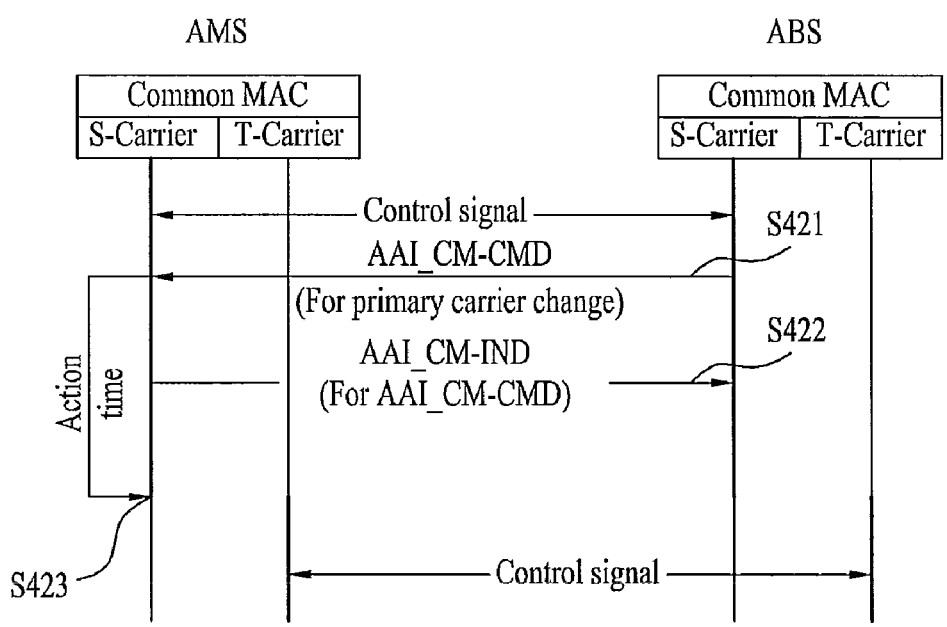

Usages of the AAI_CM-IND message will hereinafter be described with reference to FIGS. 4(a) and 4(b). FIGS. 4(a) and 4(b) are flowcharts illustrating message exchange in response to a carrier management procedure. The carrier status can be represented as follows unless there is no separate description in the annexed drawings of the present invention. In the following drawings, a carrier denoted by a solid line may represent an activated carrier, and a carrier denoted by a bold line may represent a primary carrier, and a carrier denoted by a dotted line may represent a deactivated carrier.

Referring to FIG. 4(a), an Advanced Base Station (ABS) transmits an AAI_CM-CMD message indicating secondary carrier management (activation/deactivation) to an Advanced Mobile Station (AMS) at step S411. The AMS transmits an AAI_CM-IND message to the ABS, such that it informs the ABS that a target carrier indicated by the AAI_CM-CMD message was successfully activated or deactivated. In the case of the secondary carrier activation shown in FIG. 4(a), the AAI_CM-IND message is transmitted when DL/UL of the newly activated secondary carrier is ready to transmit data traffic at step S412. Because of the AAI_CM-IND message transmission, the ABS and the AMS may communicate with each other even through the target secondary carrier at step S413.

Referring to FIG. 4(b), the ABS transmits the AAI_CM-CMD message indicating the primary carrier change to the AMS at step S421. In order to inform the ABS of the successful reception of the AAI_CM-CMD message, the AMS transmits the AAI_CM-IND message to the ABS at step S422. During the action time given by the AAI_CM-CMD message, the primary carrier change is performed at step S423. Although the exemplary primary carrier change shown in FIG. 4(b) illustrates that the serving primary carrier maintains an activation status after the completion of the primary carrier change, the serving primary carrier may enter a deactivation status after the completion of the primary carrier change. In addition, if the target carrier is kept in the deactivation status, the AMS transmits a bandwidth request (BR) to the ABS after the target carrier has been activated, such that it may inform the ABS of the readiness of the target carrier.

As described above, the AAI_CM-IND message may be adapted to inform the ABS of the readiness of the target carrier when the secondary carrier management is indicated by the AAI_CM-CMD message. If the primary carrier change is indicated by the AAI_CM-CMD message, the AAI_CM-IND message may be adapted to inform the ABS that the AAI_CM-CMD message was successfully received in the AMS.

In the case of the secondary carrier management, the ABS is unable to confirm whether the AMS has received the AAI_CM-CMD message, such that the ABS has to wait indefinitely for the AAI_CM-IND message until the AMS has completed the activation of the target carrier. In addition, in the case of the primary carrier change, the AAI_CM-IND message may represent only the successful reception of the AAI_CM-CMD message, and may not be used as a message that indicates the readiness of the target carrier.

As described above, the obscurity indicating different purposes of the AAI_CM-IND message may be present as necessary, such that the following factors may be considered to solve the above obscurity.

Each of the AAI_CM-CMD message and the AAI_CM-IND message corresponds to the MAC control message. The MAC control message may be used when the peer-to-peer protocol of each MAC layer of the ABS and the AMS performs a control plane function. The MAC control message may be returned to a MAC Protocol Data Unit (MAC PDU) that is transmitted through broadcast, unicast, or random access control connection. There is only one unicast control connection, and Hybrid Automatic Repeat reQuest (HARQ) may be operated in the MAC control message that is transmitted on the unicast control connection.

If the MAC PDU includes a payload from the control connection, a MAC Control Extended Header (MCEH) may be utilized. The MCEH format may be defined as shown in Table 2. As can be seen from Table 2, the polling bit of the MCEH may be set to '0' when the acknowledgement of the MAC control message reception is not requested, and may be set to '1' when the acknowledgement of the MAC control message reception is requested.

TABLE 2

| Syntax | Size (bit) | Notes |
| --- | --- | --- |
| MCEH ( ) { | | |
| EC | 1 | Encryption Control indicator<br>0 = Payload is not encrypted<br>1 = Payload is encrypted |
| Control Connection Channel ID (CCC ID) | 1 | Channel ID to identify separate fragmentation/reassembly |

TABLE 2-continued

| Syntax | Size (bit) | Notes |
| --- | --- | --- |
| | | state machines<br>0: channel 1<br>1: channel 2 |
| SN Indicator | 1 | 0 = no FC and sequence number<br>1 = FC and sequence number are followed |
| If (SN Indicator = 0) {<br>  Reserved<br>else {<br>  Polling | 5<br><br>1 | For byte alignment<br><br>0 = no acknowledgement required<br>1 = acknowledge required upon receiving the MAC message |
| FC | 2 | Fragmentation control (see Table 665) |
| SN | 3 | Payload sequence number |
| Reserved<br>}<br>} | 2 | For byte alignment |

The ABS and the AMS may use a MAC Control Message ACK Extended Header (MAEH) to indicate the reception of a specific MAC control message that has already been received. In the case where the ABS or the AMS receives either the MAC control message or the MAC control message fragment having an MCEH wherein the polling bit is set to '1', the ABS or the AMS transmits an MAEH as an acknowledgment after receiving a full message with the sequence number of a MAC control message PDU or a sequence number of the last received fragment if fragmented. The MAEH format can be represented by the following Table 3.

TABLE 3

| Syntax | Size (bits) | Notes |
| --- | --- | --- |
| MAEH ( ) { | | |
| Type | 4 | MAEH type |
| ACK_SN | 8 | SN retrieved from the MCEH of the MAC PDU with the Polling bit set to 1 |
| Control Connection Channel ID (CCC ID) | 1 | Control Connection Channel ID (CCC ID) that the MAC management message is received. |
| Reserved<br>} | Variable | For byte alignment |

In the meantime, the ABS and the AMS may use the AAI message acknowledgement (AAI_MSG-ACK) message to indicate the reception of the AMC control message. If a message in which the polling bit of the MCEH is set to '1' is received through control connection, the ABS and the AMS may transmit the AAI_MSG-ACK message as an acknowledgement message indicating MAC control message reception.

In association with the above-mentioned operation in which the AAI_MSG-ACK message or the MAEH is used as an acknowledgement message when the polling bit of the MCEH of the MAC control message is set to '1', MAC management reliability will hereinafter be described in detail.

All MAC control messages can be fragmented. As described above, HARQ can be applied to all kinds of unicast MAC control messages. A retransmission timer may be defined for a MAC control message that requires reliable transmission. The retransmission timer starts operation when a transmitter starts transmitting the MAC control message, and waits for a response message (e.g., an AAI Ranging Response (AAI_RNG-RSP) message is a response to an AAI ranging request (AAI_RNG-REQ) message. The retransmission timer stops operation upon receiving a response message from a receiver. In the case where a local NACK for the MAC control message is operated, and the HARQ process results in a failure before the expiration of the retransmission timer, the transmitter may start retransmitting a full control message transmitted from the failed HARQ burst or a control message fragment as necessary. During the retransmission of the control message fragment retransmission started by the local NACK, the transmitter may retransmit a control message fragment having the same information (MCEH and payload) as in an initial transmission operation.

The transmitter may ask the receiver to transmit the MAC layer acknowledgement (ACK) message so as to determine a status of the transmitted control message. If the MAC layer acknowledgement (ACK) message is used, the transmitter may set the polling bit to '1' at the MCEH of the MAC PDU that includes either a full control message or the last pending fragment of a control message. Immediately after transmission of the MAC PDU in which the polling bit is set to '1', the transmitter starts operating an ACK timer and waits for the AAI_MSG-ACK message or the MAEH. In the case of receiving a local NACK for a MAC PDU that sends back the MCEH in which the polling bit is set to '1', the transmitter retransmits the MAC PDU having the last fragment and at the same time sets the polling bit of the MCEH to '1'. Upon receiving the local NACK, the ACK timer stops operation. The ACK timer stopped by the local NACK retransmits the last fragment and at the same time restarts operation. Upon receiving the AAI_MSG-ACK message or the MAEG, the ACK timer stops operation. If the ACK timer has expired before the reception of the ACK message or the expiration of the retransmission timer, the transmitter may restart retransmission of an overall message. If the retransmission timer has expired, the transmitter may stop operating the ACK timer. If the retransmission operation begins after the ACK timer or the retransmission timer has expired, the transmitter may reset the retransmission timer.

If the receiver receives a control message of the MAC PDU in which the polling bit of the MAEH is set to '1' or a control message fragment, the receiver may answer the MAC PDU control message or the control message fragment using the AAI_MSG-ACK message or the MAEH so as to indicate the reception of the full control message. In relation to the fragmented control message, the receiver receives all fragments of the control message, and then transmits the AAI_MSG-ACK message or the MAEH.

A general transmission scheme for the MAC control message will hereinafter be described in detail.

First of all, various types of request/response (REQ/RSP) messages will hereinafter be described. For example, AAI ranging request/AAI ranging response (AAI_RNG-REQ/AAI_RNG-RSP) messages, AAI Subscriber station Basic Capability Request/AAI Subscriber station Basic Capability Response (AAI_SBC-REQ/AAI_SBC-RSP) messages, AAI registration request/AAI registration response (AAI_REG-REQ/AAI_REG-RSP) messages, and AAI Handover Request/AAI Handover Response (AAI_HO-REQ/AAI_HO-RSP) messages may be defined as REQ/RSP messages. As described above, in the case where an REQ MAC control message and its associated RSP message are defined, a retransmission timer for receiving the RSP message when the REQ message is transmitted may be configured as described in the above-mentioned control message reliability. If the transmitter receives no RSP message from the receiver, the transmitter determines transmission failure of the REQ message such that it can retransmit the REQ message. In other words, assuming that both the REQ message and the RSP message are defined, the RSP message performs a message ACK function for reliable transmission of the REQ message.

On the other hand, the RSP message may also answer the REQ message using the AAI_MSG-ACK or the MAEH. For example, an AAI handover command (AAI_HO-CMD) message or an AAI handover indication (AAI_HO-IND) message for HO cancellation may be defined. Although the AAI_HO-CMD or AAI_HO-IND message may trigger or request a certain procedure or operation, an RSP message corresponding to the AAI_HO-CMD or AAI_HO-IND message has not yet been defined. Therefore, an RSP message is needed for reliable transmission of the REQ MAC control message. In association with the above-mentioned operation, assuming that the polling bit of the MCEH of the REQ MAC control message is set to '1' and the receiver succeeds in receiving the REQ message, the receiver may transmit the AAI_MSG-ACK or MAEH.

In the case of considering the above-mentioned descriptions, the AAI_CM-CMD message serves as a MAC control message in a carrier management procedure such that reliable transmission of the AAI_CM-CMD message is needed. However, in the currently-defined secondary carrier management procedure, the AAI_CM-IND message is transmitted to the ABS after the activation of a target carrier, such that the ABS is unable to recognize whether the AAI_CM-CMD message was successfully received in the AMS. Therefore, the embodiment of the present invention proposes an improved technology in which the AAI_CM-CMD message requests a response message (AAI_MSG-ACK message or MAEH) indicating the successful reception and the AAI_CM-IND message is adapted to inform the ABS of the readiness of the target carrier.

In addition, assuming that the target carrier (T-carrier) is one of deactivated carriers in a primary carrier change procedure, according to the currently defined procedure, the AMS has transmitted a bandwidth request (BR) to the ABS so as to inform the ABS of the readiness of the target carrier (T-carrier), and the AAI_CM-IND message has been used only to acknowledge the successful reception of the AAI_CM-CMD message. The above-mentioned AAI_CM-IND message has an objective different from that of another AAI_CM-IND message that has been defined in the secondary carrier management procedure, resulting in the occurrence of the obscurity. In order to remove the obscurity, not only in the primary carrier change procedure but also in the secondary carrier management procedure, it is preferable that the AAI_CM-IND message be used as a message that informs the ABS of the readiness of the target carrier (T-carrier).

Therefore, three-step procedures of the AAI_CM-CMD message, the acknowledgement (ACK) message of the AAI_MSG-ACK message or the MAEH, and the AAI_CM-IND message can be defined as follows.

The ABS sets a polling bit of the MCEH of the AAI_CM-CMD message to '1', and transmits the resultant AAI_CM-CMD message to the ABS. The ABS starts operating the retransmission timer when transmitting the AAI_CM-CMD message. If the ABS receives the AAI_MSG-ACK message or the MAEH before the expiration of the retransmission timer, the ABS stops operating the retransmission timer and begins to perform a corresponding carrier management procedure. If the retransmission timer has expired, the ABS may retransmit the AAI_CM-CMD message.

From the viewpoint of the AMS, if the AMS has successfully received the AAI_CM-CMD message, the AMS may transmit the AAI_MSG-ACK message or MAEH to inform the ABS of the successful reception of the AAI_CM-CMD message.

The AAI_CM-IND message may be adapted to inform the ABS of the readiness of the target carrier (T-carrier), irrespective of action codes (where, a code '0' means secondary carrier management and a code '1' means primary carrier change) of the AAI_CM-CMD message. That is, if a target carrier (T-carrier) of the AAI_CM-CMD message is one of the deactivated carriers (wherein the target carrier may be a deactivated carrier when the AMS is operated in single carrier mode), the AAI_CM-IND message may be used to inform the ABS of the readiness of the target carrier (T-carrier).

In association with the above-mentioned description, if the action code of the AAI_CM-CMD message indicates the primary carrier change, the AAI_CM-IND message may be transmitted on the target carrier (T-carrier) after successfully performing the switching to the target carrier (T-carrier) at an action time specified by the AAI_CM-CMD message. If the AMS fails to perform the switching at the action time, the AAI_CM-IND message may be transmitted on the serving primary carrier. If the serving carrier (S-carrier) is deactivated, the AAI_CM-IND message may also be transmitted to the serving carrier (S-carrier) through a bandwidth request (BR).

Figure 5:
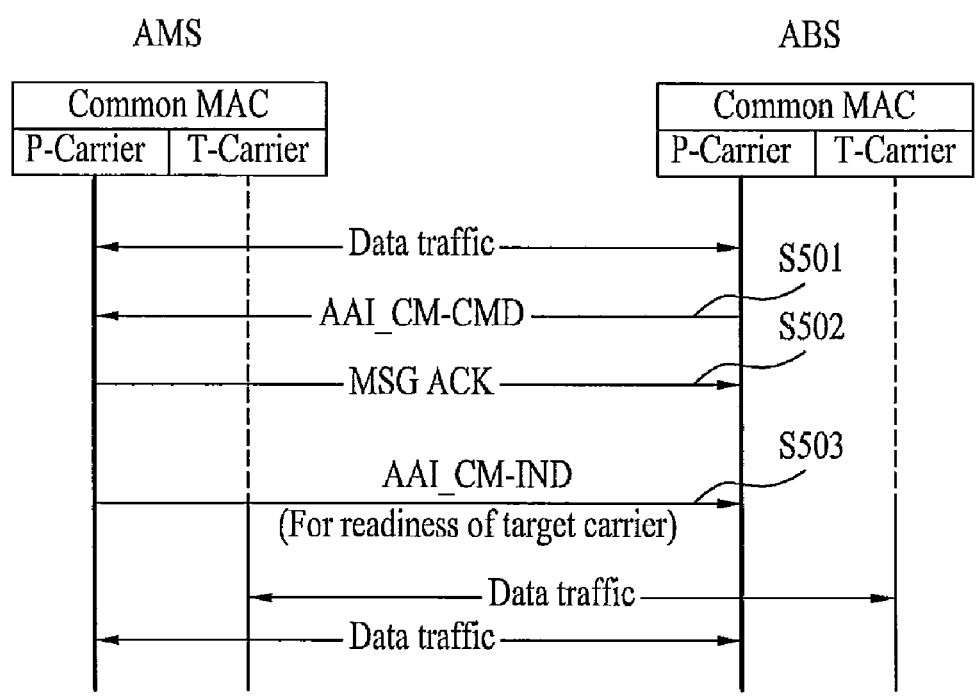
FIG. 5 is a flowchart illustrating usages of an acknowledgement message for use in a secondary carrier management procedure according to one embodiment of the present invention.

Secondary carrier management according to one embodiment of the present invention will hereinafter be described with reference to FIG. 5. FIG. 5 is a flowchart illustrating usages of an acknowledgement message for use in a secondary carrier management procedure according to one embodiment of the present invention. Referring to FIG. 5, the AAI_CM-CMD message in which the action code indicates the secondary carrier management is transmitted from the ABS to the AMS, the activation of the target carrier (T-carrier) is indicated by an indication type of the AAI_CM-CMD message at step S501. A target carrier (T-carrier) may be represented by a deactivated carrier denoted by a dotted line. When the ABS transmits the AAI_CM-CMD message, the polling bit of the MCEH may be set to '1', such that the resultant AAI_CM-CMD message is then transmitted. Therefore, the AAI_MSG-ACK message or the MAEH in relation to the AAI_CM-CMD message may be transmitted through the primary carrier (P-carrier) at step S502. If the ABS receives the AAI_MSG-ACK message or the MAEH from the AMS, it waits for the AAI_CM-IND message. The AMS represents the target carrier (T-carrier) by an activated carrier denoted by a solid line, and transmits the AAI_CM-IND message indicating the readiness of the target carrier (T-carrier) through the primary carrier (P-carrier) at step S503. After the transmission of the AAI_CM-IND message, the ABS and the AMS may communicate with each other through the target carrier (T-carrier).

Figure 6:
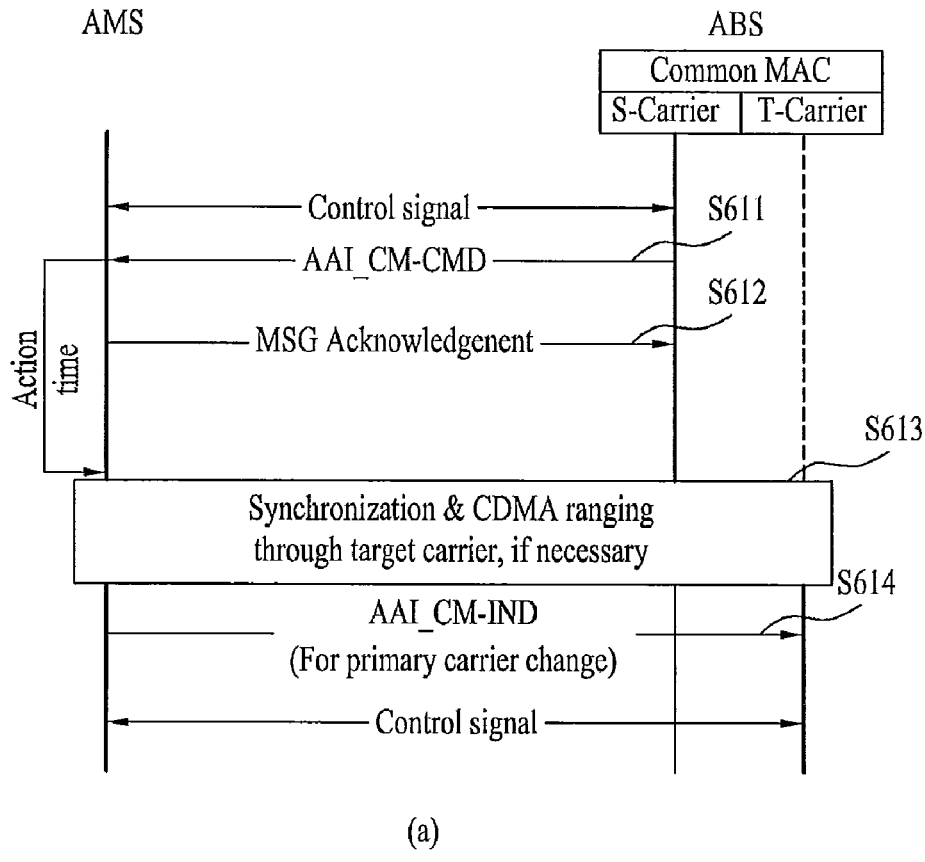
FIGS. 6(a) and 6(b) are flowcharts illustrating usages of an acknowledgement message for use in a primary carrier change procedure according to one embodiment of the present invention.
Figure 6:
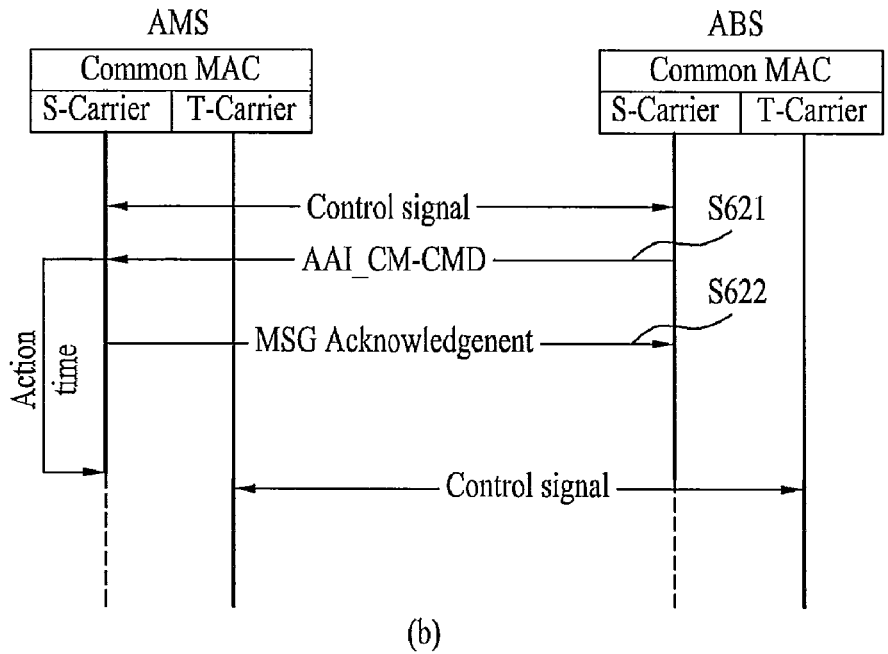

An exemplary form of primary carrier change according to one embodiment of the present invention will hereinafter be described with reference to FIGS. 6(a) and 6(b). FIGS. 6(a) and 6(b) are flowcharts illustrating usages of an acknowledgement message for use in a primary carrier change procedure according to one embodiment of the present invention.

An exemplary case in which a target primary carrier is a deactivated carrier will hereinafter be described with reference to FIG. 6(a). Referring to FIG. 6(a), the AAI_CM-CMD message in which the action code indicates primary carrier change is transmitted from the ABS to the AMS at step S611. The ABS may set the polling bit of the MCEH of the AAI_CM-CMD message to '1' so as to acknowledge successful reception of the AAI_CM-CMD message. The AMS may transmit the AAI_MSG-ACK message or MAEH for the AAI_CM-CMD message through the serving carrier (S-carrier) at step S612. The AAI_MSG-ACK message or the MAEH may be transmitted to the ABS prior to the action time specified by the AAI_CM-CMD message. The AMS performs switching to the target carrier (T-carrier) at an action time by referring to the action time specified by the AAI_CM-CMD message. If necessary, the synchronization and the CDMA ranging (or periodic ranging) may be performed through the target carrier (T-carrier) at step S613. Because the target carrier (T-carrier) is a deactivated carrier, the AMS may transmit the AAI_CM-IND message indicating readiness of the target carrier (T-carrier) to the ABS through the target carrier (T-carrier) after the lapse of the action time at step S614. After the execution of the primary carrier change, the ABS may transmit and receive control signals and data to and from the AMS through the target primary carrier.

In this case, the AAI_CM-IND message may be transmitted through the changed target primary carrier after the completion of the successful primary carrier change. In contrast, if the primary carrier change results in a failure, the AAI_CM-IND message may be transmitted through the serving primary carrier. Although FIG. 6(a) shows that the serving carrier (S-carrier) is activated after the completion of the primary carrier change, the 'Next State of Serving Primary Carrier' field of the serving primary carrier contained in the AAI_CM-CMD message may determine whether the serving primary carrier is to be maintained in an activated or deactivated state after the completion of the primary carrier change. If the AMS is a single carrier AMS that does not support carrier aggregation, the above-mentioned field may always be set to '0' (where the serving carrier (S-carrier) is deactivated after the completion of the primary carrier change). If the serving primary carrier is deactivated after the completion of the primary carrier change and then the primary carrier change results in a failure, the AAI_CM-IND message may be transmitted through a bandwidth request (BR) on the serving carrier (S-carrier).

Next, an exemplary case in which the target primary carrier is an activated carrier will hereinafter be described with reference to FIG. 6(b). The transmission of the AAI_CM-CMD message transmission (S621) and the transmission of the AAI_MSG-ACK message or MAEH (S622) shown in FIG. 6(b) are similar to those of FIG. 6(a). In FIG. 6(b), because the target carrier (T-carrier) is a pre-activated carrier, the AAI_CM-IND message that informs the ABS of the readiness of the target carrier (T-carrier) may be omitted. In other words, the AMS does not transmit the AAI_CM-IND message, and may transmit and receive control signals and data to and from the ABS through the target primary carrier at an action time specified by the AAI_CM-CMD message. The serving primary carrier may also be deactivated after the completion of the carrier change.

Action Time and Disconnection Time in Carrier Management Procedure

One embodiment in which an action time specified by the AAI_CM-CMD message is defined in the carrier management procedure and a disconnection time of a deactivated carrier is defined will hereinafter be described in detail.

The primary carrier change for use in the carrier management procedure starts operation by the AAI_CM-CMD message. The AAI_CM-CMD message is a MAC control message that requests reliable transmission, and the ABS transmits the AAI_CM-CMD message and starts operating the retransmission timer. In addition, the action time field is defined in the AAI_CM-CMD message, and the AMS performs switching to the target fully configured carrier at an action time specified by the AAI_CM-CMD message. The action time may be defined as a Least Significant Bit (LSB) of a super frame number (SFN) at a time that switches to the target carrier (T-carrier).

By the currently defined action time, the action time may expire while the AMS receives the AAI_CM-CMD message and prepares for the operation of T-carrier activation. In other words, although the AMS is normally operated, the target carrier (T-carrier) may not yet be prepared for at an action time where the primary carrier change is to be carried out. In other words, when the action time specified by the AAI_CM-CMD message is set to a specific time before the AAI_CM-IND message is received by in the ABS, the ABS may misunderstand that the AAI_CM-CMD message has not been successfully received in the AMS and the AMS has rejected the request of the ABS. This misunderstanding may cause primary carrier change to fail.

Therefore, if necessary, the action time may be established at a specific time after the lapse of the retransmission timer expiration time of the AAI_CM-CMD message. In other words, the action time may be denoted by (Action Time≧AAI_CM-CMD Transmission Timing Point+Retransmission Timer Value). By the newly defined action time, the ABS may determine that the AMS has not received the AAI_CM-CMD message at the expiration time of the retransmission timer such that it can retransmit a new AAI_CM-CMD message in which the action time is newly specified. Accordingly, although the primary carrier change action time is properly established, and the AMS normally receives the message and is operated as described above, the misunderstanding of the ABS that decides that the primary carrier change procedure has failed can be prevented.

The action time field of the above-mentioned AAI_CM-CMD message may be defined as shown in the following Table 4.

TABLE 4

| Action Time | 3 | LSB bits of Superframe number at the time to switch to the target carrier<br>This value shall be set to the value more than the retransmission timer for AAI_CM-CMD message |
|---|---|---|

In addition, it is necessary to concretely define the disconnection time in the primary carrier change procedure. The serving primary carrier may be deactivated after the completion of the primary carrier change according to indication information of the AAI_CM-CMD message. Information about when the serving primary carrier is to be deactivated is not defined in a conventional carrier change procedure. Therefore, one example in which the AMS transmits the AAI_CM-IND message and at the same time disconnects a control path from the serving carrier (S-carrier) is not excluded. In this case, since a current time does not yet reach the action time and the target carrier (T-carrier) is not set to the primary carrier, a control message may be lost in the range from the disconnection time of the serving carrier (S-carrier) to the action time. In the primary carrier change, the disconnection time of the serving carrier (S-carrier) is defined to be identical to the action time defined by the AAI_CM-CMD message, such that control message loss is prevented.

Figure 7:
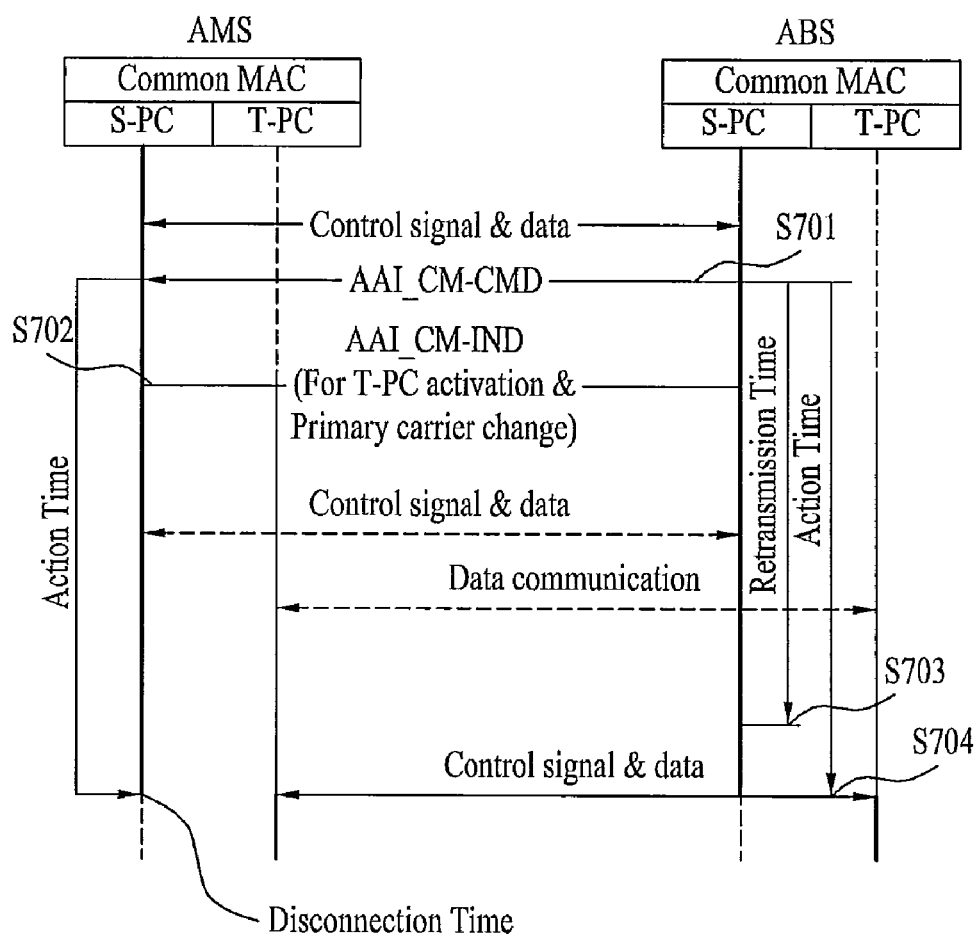
FIG. 7 is a conceptual diagram illustrating the relationship between an action time and a retransmission timer for use in a primary carrier change procedure according to one embodiment of the present invention.

FIG. 7 is a conceptual diagram illustrating the relationship between an action time and a retransmission timer for use in a primary carrier change procedure according to one embodiment of the present invention. Referring to FIG. 7, the ABS transmits the AAI_CM-CMD message to the AMS and at the same time starts operating the retransmission timer at step S701. The action code of the AAI_CM-CMD message may represent the primary carrier change, and the action time of the primary carrier change may be specified by the 'Action Time' field. In addition, the 'Next State of Serving Primary Carrier' field of the AAI_CM-CMD message may indicate that the serving primary carrier (S-PC) is deactivated after the primary carrier change. The AMS receives the AAI_CM-CMD message from the ABS. In response to the AAI_CM-CMD message, the AMS may transmit the AAI_CM-IND message indicating the readiness (activation) of the target carrier (T-carrier) to the ABS at step S702. After the target carrier (T-carrier) is activated in response to the AAI_CM-IND message, until a current time reaches the action time at which the switching to the target carrier (T-carrier) is performed, a control message can still be transmitted and received through the serving primary carrier (S-PC), and data other than the control message can be communicated through the target carrier (T-carrier). Therefore, the control message may not be lost until the serving primary carrier is severed. As described above, the action time (S704) specified by the AAI_CM-CMD message may be set to a time later than the retransmission timer expiration time (S703). The AMS may transmit and receive data and control messages to and from the ABS through a target primary carrier at the action time (S704). The disconnection of control signal communication through the serving primary carrier (S-PC) at a disconnection time, and the disconnection time may be defined to be identical to the action time. Since the next status of the primary carrier (P-carrier) is indicated as a deactivation status, the serving primary carrier (S-PC) can be deactivated after the action time (disconnection time). In the meantime, in the case where the next status of the serving primary carrier (S-PC) is commanded to be kept in an activation status after the completion of the primary carrier change, only control signal communication through the serving primary carrier (S-PC) is interrupted and the serving primary carrier (S-PC) can be kept in an activation status.

On the other hand, in the secondary carrier management (activation/deactivation), the ABS receives the AAI_CM-IND MAC control message from the AMS through the primary carrier (P-carrier), such that the ABS can confirm that carriers listed in the AAI_CM-CMD message were successfully activated or deactivated. In the case of activating the carriers listed in the AAI_CM-CMD message, the AMS can transmit the AAI_CM-IND message when downlink/uplink (DL/UL) of the newly activated carrier is ready to be used for data traffic transmission.

In relation to the above description, the AMS can be operated in a carrier aggregation mode in which the AMS can simultaneously transmit and receive data to and from the ABS through one or more carriers. Although the AMS supporting the carrier aggregation mode receives n assigned carriers from the ABS, the AMS having only the capability capable of aggregating only m carriers (1<m<n, m=integer) from among the n assigned carriers may be present. In the case where all the m carriers are used as activated carriers by the AMS, a certain activated secondary carrier (Carrier_1) may be deactivated due to a channel quality, load balancing, or the like, and the activation of another one (Carrier_2) from among the n assigned carriers may be needed.

In the above-mentioned case, a secondary carrier management action corresponding to the action code '0' may be specified in the currently defined AAI_CM-CMD message, such that a first target carrier (Target Carrier_1) can be deactivated and at the same time a second target carrier (Target Carrier_2) can be activated.

The AMS may transmit the AAI_CM-IND message in response to one AAI_CM-CMD message. The AAI_CM-IND message has the following meanings according to actions indicated by the AAI_CM-CMD message. If the action indicated by the AAI_CM-CMD message is activation, the AAI_CM-IND message is transmitted from the AMS to the ABS so as to indicate that the target carrier (T-carrier) was activated and the readiness of data communication was completed. Otherwise, if the action indicated by the AAI_CM-CMD message is deactivation, the AMS transmits the AAI_CM-IND message to the ABS and at the same time data communication with the target carrier is severed.

Therefore, if one target carrier (Target Carrier_2) indicated to be activated and the other target carrier (Target Carrier_1) indicated to be deactivated cannot be simultaneously activated due to the restriction of the above-mentioned AMS capability, the AMS is unable to transmit the AAI_CM-IND message indicating the readiness of the newly activated target carrier (Target Carrier_2) to the ABS. In other words, the AMS can activate the target carrier (Target Carrier_2) after the completion of deactivation of the other target carrier (Target Carrier_1), and no method capable of informing the ABS of the activation of the target carrier (Target Carrier_2) using the AAI_CM-IND message is defined in the currently defined AAI_CM-IND message.

In order to solve the above-mentioned problem, a carrier disconnection time may be defined in relation to secondary carrier management (activation/deactivation). When the ABS transmits the AAI_CM-CMD message to command the deactivation of the target carrier, a disconnection time of the target carrier can be defined in relation to the AAI_CM-CMD message. A variety of methods (a), (b), (c) and (d) for defining the carrier disconnection time will hereinafter be described.

(a) In the case where the action code of the AAI_CM-CMD message is set to '0' (secondary carrier management) and the indication type #1 is set to '1' (deactivation), a disconnection time is defined.
(b) Only when the action code of the AAI_CM-CMD message is set to '0' (secondary carrier management), the indication type #0 is set to '1' (activation), and the indication type #1 is also set to '1' (deactivation), a disconnection time is defined.
(c) Only when a disconnection time flag is defined and the disconnection time flag is set to '1', a disconnection time is defined.
(d) No disconnection time is defined in the AAI_CM-CMD message, and a reception time of the AAI_CM-CMD message is implicitly defined as a disconnection time of the target carrier.

In the case where the number of target carriers to be deactivated in the above-mentioned cases (a) and (b) is set to 'n', n disconnection times for individual carriers may be defined, and the same one disconnection time may be defined for all the n target carriers. In the above-mentioned method (c), the disconnection time flag may be set to '1' only when an unexpected problem caused by the above-mentioned AMS capability occurs (i.e., only when the first target carrier (Target Carrier_1) and the second target carrier (Target Carrier_2) cannot be simultaneously activated).

Figure 8:
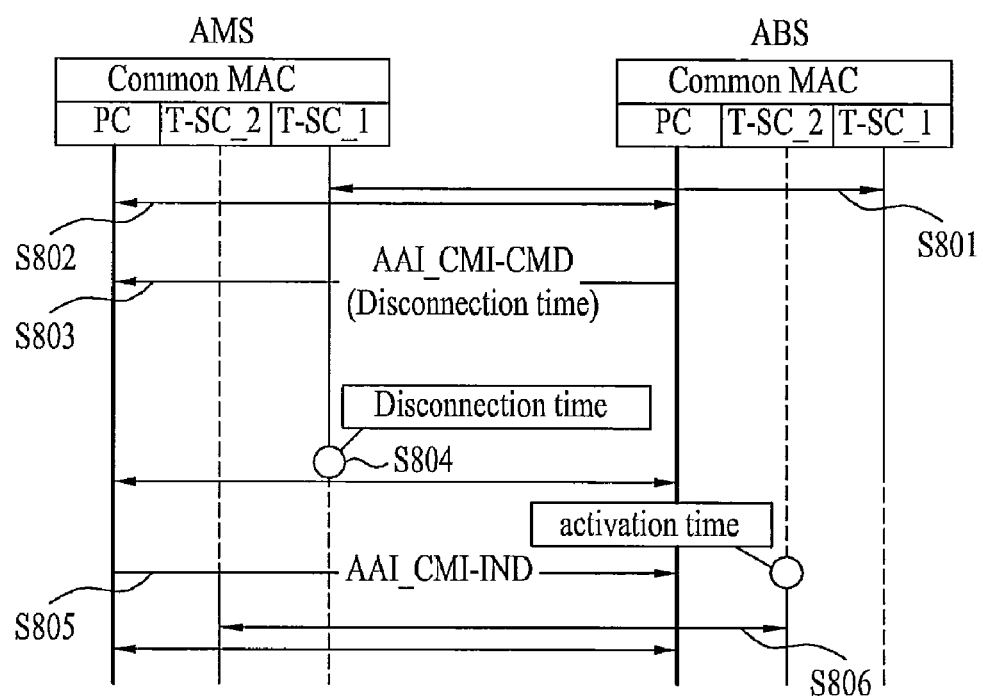
FIG. 8 illustrates a disconnection time for use in a secondary carrier management procedure according to one embodiment of the present invention.

FIG. 8 illustrates a disconnection time for use in a secondary carrier management procedure according to one embodiment of the present invention. A secondary carrier management procedure to be used when a disconnection time is defined will hereinafter be described with reference to FIG. 8.

Referring to FIG. 8, the AMS transmits and receives a control message and data to and from the ABS through a primary carrier (PC) at step S801. The AMS transmits and receives data to and from the ABS through a secondary carrier (T-SC_1) at step S802. The AAI_CM-CMD message transmitted from the AMS to the AMS includes parameters that are needed to deactivate the first target secondary carrier (T-SC_1) and activate the second target secondary carrier (T-SC_2). In addition, the AAI_CM-CMD message includes a disconnection time for the first target secondary carrier (T-SC_1) at step S803. As described above, the first target secondary carrier (T-SC_1) and the second target secondary carrier (T-SC_2) cannot be simultaneously activated due to the restriction of the AMS capability, such that the AMS firstly deactivates the first target secondary carrier (T-SC_1) at the disconnection time indicated by the AAI_CM-CMD message at step S804. As can be seen from FIG. 8, the representation of the first target secondary carrier (T-SC_1) is changed from a solid line (activation) to a dotted line (deactivation) at the disconnection time. By the deactivation of the first target secondary carrier (T-SC_1), the AMS can activate the second target secondary carrier (T-SC_2). The AMS deactivates the deactivated second target secondary carrier (T-SC_2) on the basis of the AAI_CM-CMD message. If data is ready to be transmitted or received through the newly activated second target carrier (T-SC_2), the AMS informs the ABS of the readiness of data at step S805. If the ABS receives the AAI_CM-IND message from the AMS, data can be transmitted and/or received between the ABS and the AMS through the second target secondary carrier (T-SC_2) at step S806. During the above-mentioned secondary carrier management procedure, the AMS can continuously transmit and receive a control signal and data to and from the ABS through the primary carrier (PC).

As described above, in reference to the AAI_CM-CMD message for indicating secondary carrier activation and deactivation, as to the deactivation of the first target secondary carrier, the ABS can recognize the deactivation of the target carrier at a defined disconnection time without receiving a message for indicating the first target secondary carrier deactivation from the AMS through the AAI_CM-IND message and others. As to the activation of the second target secondary carrier, the ABS receives the AAI_CM-IND message, such that it can recognize that the second target secondary carrier (T-SC_2) is ready or prepared.

On the other hand, each inventive embodiment for defining the disconnection time in the secondary carrier management procedure is not limited only to a specific case in which several target secondary carriers are unable to be simultaneously activated owing to the restriction of AMS capability, and may also be applied to other exemplary cases as necessary. Since the disconnection time is defined in an arbitrary case in which the deactivation of the target secondary carrier (T-SC) is indicated in the secondary carrier management procedure, those skilled in the art can easily appreciate that the error encountered in the secondary carrier management procedure is prevented and the accuracy of operation is increased.

A variety of associated embodiments in which the disconnection time of the target secondary carrier is defined by defining a parameter of the AAI_CM-CMD message will hereinafter be described. First of all, basic parameters of the AAI_CM-CMD message can be configured as represented by the following Table 5.

TABLE 5

| Field | Size (bit) | Description |
|---|---|---|
| AAI_Carrier Management Command message format( ){ | | |
| Management Message Type | 8 | AAI_CM-CMD |
| Action code | 1 | 0: Secondary Carrier Management<br>1: Primary carrier change |
| If (Action code == 0){ | | This message is for secondary carrier activation and/or deactivation |
|   Indication Type | 2 | For Activation and/or Deactivation<br>Bit #0: '0': No action, '1': Activation<br>Bit #1: '0': No action, '1': Deactivation |
| If (Indication Type #0 == 1) | | |
|   Num of target carrier | [TBD] | The number of newly activated carrier(s) |
|   For(i=0; i< Num of target carrier; i++){ | | |
|     Target carrier index | [TBD] | Target carrier index for activation |
|     Activation of DL/UL | 1 | '0': Both DL/UL are activated<br>'1': DL is activated but UL is not activated |
|     Ranging indicator | 1 | Ranging indicator for target carrier<br>'0': No ranging is required for the target carrier<br>'1': Periodic ranging is required for the target carrier |
|   } | | |
| } | | |
| If (Indication Type #1 == 1){ | | |
|   Num of target carrier | [TBD] | The number of deactivated carrier(s) |
|   For(i=0; i< Num of target carrier; i++){ | | |
|     Target carrier index | [TBD] | Target carrier index for deactivation |
|     Deactivation of DL/UL | 1 | '0': Both DL/UL are deactivated<br>'1': UL is deactivated but DL is kept active |
|   } | | |
| } | | |
| } | | |
| If (Action code == 1){ | | This message is for primary carrier change. |
|   Target carrier index | [TBD] | Target carrier index for primary carrier change |
|   Action Time | [TBD] | LSB bits of Superframe number at the time to switch to the target carrier<br>This value shall be set to the value more than the retransmission time for AAI_CM-CMD message |
|   Next state of serving primary carrier | 1 | '0': Serving carrier will be deactivated after primary carrier change<br>'1': Serving carrier is kept active after primary carrier change |
| } | | |
| } | | |

(1) In relation to an indication for target secondary carrier (T-SC) deactivation, a disconnection time can be defined. One disconnection time may be defined for N target secondary carriers (N T-SCs). Therefore, some parameters of the AAI_CM-CMD message can be defined as in the following Table 6.

TABLE 6

| Field | Size (bit) | Description |
|---|---|---|
| ... | | |
| If (Indication Type #1 == 1){ | | |
|   Num of target carrier | [TBD] | The number of deactivated carrier(s) |
| Disconnection time | [TBD] | LSB bits of at Superframe number the time to disconnect the connection with the target carrier(s) |
| For(i=0; i< Num of target carrier; i++){ | | |
|   Target carrier index | [TBD] | Target carrier index for deactivation |
|   Deactivation of DL/UL | 1 | '0': Both DL/UL are deactivated<br>'1': UL is deactivated but DL is kept active |
|   } | | |
| } | | |
| ... | | |

(2) In relation to an indication for target secondary carrier (T-SC) deactivation, a disconnection time can be defined only when a disconnection time flag is set to '1'. One disconnection time may be defined for N target secondary carriers (N T-SCs). Therefore, some parameters of the AAI_CM-CMD message can be defined as in the following Table 7.

TABLE 7

| Field | Size (bit) | Description |
|---|---|---|
| ... | | |
| If (Indication Type #1 == 1){ | | |
|   Num of target carrier | [TBD] | The number of deactivated carrier(s) |
|   Disconnection time Flag | 1 | Flag for the disconnection time |
|   If (Disconnection time Flag==1){ | | |
|     Disconnection time | [TBD] | LSB bits of Superframe number at the time to disconnect the connection with the target carrier(s) |
|   } | | |
|   For(i=0; i< Num of target carrier; i++){ | | |
|     Target carrier index | [TBD] | Target carrier index for deactivation |
|     Deactivation of DL/UL | 1 | '0': Both DL/UL are deactivated |

TABLE 7-continued

| Field | Size (bit) | Description |
|---|---|---|
| } } ... | | '1': UL is deactivated but DL is kept active |

(3) In relation to an indication for target secondary carrier (T-SC) deactivation, a disconnection time can be defined. N disconnection times may be defined for N target secondary carriers (N T-SCs). Therefore, some parameters of the AAI_CM-CMD message can be defined as in the following Table 8.

TABLE 8

| Field | Size (bit) | Description |
|---|---|---|
| ... | | |
| If (Indication Type #1 == 1){ | | |
| Num of target carrier | [TBD] | The number of deactivated carrier(s) |
| For(i=0; i< Num of target carrier; i++){ | | |
| Target carrier index | [TBD] | Target carrier index for deactivation |
| Deactivation of DL/UL | 1 | '0': Both DL/UL are deactivated '1': UL is deactivated but DL is kept active |
| Disconnection time | [TBD] | LSB bits of Superframe number at the time to disconnect the connection with the target carrier(s) |
| } } ... | | |

(4) In relation to an indication for target secondary carrier (T-SC) deactivation, a disconnection time can be indicated only when a disconnection time flag is set to '1'. One or more disconnection times may be defined for N target secondary carriers (N T-SCs). Therefore, some parameters of the AAI_CM-CMD message can be defined as in the following Table 9.

TABLE 9

| Field | Size (bit) | Description |
|---|---|---|
| ... | | |
| If (Indication Type #1 == 1){ | | |
| Num of target carrier | [TBD] | The number of deactivated carrier(s) |
| For(i=0; i< Num of target carrier; i++){ | | |
| Target carrier index | [TBD] | Target carrier index for deactivation |
| Deactivation of DL/UL | 1 | '0': Both DL/UL are deactivated '1': UL is deactivated but DL is kept active |
| Disconnection time Flag | 1 | Flag for the disconnection time |
| If (Disconnection time Flag==1){ | | |
| Disconnection time | [TBD] | LSB bits of Superframe number at the time to disconnect the connection with the target carrier(s) |

TABLE 9-continued

| Field | Size (bit) | Description |
|---|---|---|
| } } } ... | | |

(5) In the case where activation and deactivation of a target secondary carrier are simultaneously indicated, a disconnection time can be defined. One disconnection time may be defined for N target secondary carriers (N T-SCs). Therefore, some parameters of the AAI_CM-CMD message can be defined as in the following Table 10.

TABLE 10

| Field | Size (bit) | Description |
|---|---|---|
| ... | | |
| If (Indication Type #1 == 1){ | | |
| Num of target carrier | [TBD] | The number of deactivated carrier(s) |
| If (Indication Type #0 == 1){ | | |
| Disconnection time | [TBD] | LSB bits of Superframe number at the time to disconnect the connection with the target carrier(s) |
| } | | |
| For(i=0; i< Num of target carrier; i++){ | | |
| Target carrier index | [TBD] | Target carrier index for deactivation |
| Deactivation of DL/UL | 1 | '0': Both DL/UL are deactivated '1': UL is deactivated but DL is kept active |
| } } ... | | |

(6) In the case where activation and deactivation of a target secondary carrier are simultaneously indicated, a disconnection time can be defined only when a disconnection time flag is set to '1'. One disconnection time may be defined for N target secondary carriers (N T-SCs). Therefore, some parameters of the AAI_CM-CMD message can be defined as in the following Table 11.

TABLE 11

| Field | Size (bit) | Description |
|---|---|---|
| ... | | |
| If (Indication Type #1 == 1){ | | |
| Num of target carrier | [TBD] | The number of deactivated carrier(s) |
| Disconnection time Flag | 1 | Flag for the disconnection time |
| If (Indication Type #0 == 1 && Disconnection time Flag ==1){ | | |
| Disconnection time | [TBD] | LSB bits of Superframe number at the time to disconnect the connection with the target carrier(s) |
| } | | |
| For(i=0; i< Num of target carrier; i++){ | | |
| Target carrier index | [TBD] | Target carrier index for deactivation |
| Deactivation of DL/UL | 1 | '0': Both DL/UL are deactivated |

TABLE 11-continued

| Field | Size (bit) | Description |
|---|---|---|
| } } ... | | '1': UL is deactivated but DL is kept active |

(7) In the case where activation and deactivation of a target secondary carrier are simultaneously indicated, a disconnection time can be defined only when a disconnection time flag is set to '1'. One or more disconnection times may be defined for N target secondary carriers (N T-SCs). Therefore, some parameters of the AAI_CM-CMD message can be defined as in the following Table 12.

TABLE 12

| Field | Size (bit) | Description |
|---|---|---|
| ... | | |
| If (Indication Type #1 == 1){ | | |
| Num of target carrier | [TBD] | The number of deactivated carrier(s) |
| For(i=0; i< Num of target carrier; i++){ | | |
| Target carrier index | [TBD] | Target carrier index for deactivation |
| Deactivation of DL/UL | 1 | '0': Both DL/UL are deactivated '1': UL is deactivated but DL is kept active |
| Disconnection time Flag | 1 | Flag for the disconnection time |
| If (Indication Type #0 == 1 && Disconnection time Flag ==1){ | | |
| Disconnection time | [TBD] | LSB bits of Superframe number at the time to disconnect the connection with the target carrier(s) |
| } } } ... | | |

Since the disconnection time of the secondary carrier deactivation is established as described in the above embodiments, although a multi-carrier AMS receives indication information of secondary carrier activation/deactivation through one AAI_CM-CMD message, the confusion of the usage of the AAI_CM-IND message is removed, such that the carrier management procedure can be effectively and correctly carried out.

Common Mac Handover (HO) and Carrier Change Procedure

As previously stated in FIG. 2(a), in the ABS capable of supporting a single carrier, one PHY is controlled by one MAC controller, and a plurality of MAC-PHY entities may be present in one cell. One base station identifier (BSID) is assigned to each MAC-PHY entity. While the single carrier supported AMS transmits and receives data by a single MAC-PHY entity, it may perform inter-frequency handover to another MAC-PHY entity having a different BSID in the same cell according to a channel status or other conditions.

In order to perform effective handover, the ABS may periodically broadcast a neighbor advertisement (MOB_NBR-ADV) message. The MOB_NBR-ADV message is configured to transmit only values of differences in system information (SI) and physical channel information between a current serving ABS and each neighbor ABS. In the case of co-located Frequency Assignment (FA), a preamble index, handover process optimization, Downlink Channel Descriptor (DCD)/Uplink Channel Descriptor (UCD) configuration change count, Type-Length-Value (TLV) coded neighbor information, and the like may be omitted as necessary.

A general handover procedure will hereinafter be described. In the case of a handover (HO) initiated by an ABS, an unsolicited Advanced Air Interface (AAI) handover command (AAI_HO-CMD) message may be transmitted without transmission of an AAI handover request (AAI_HO-REQ) message. The AMS may perform network re-entry to a target ABS at an action time defined by the AAI_HO-CMD message. If possible, an AAI handover indication (AAI_HO-IND) message may be transmitted prior to the disconnection time in response to the AAI_HO-CMD message, however it should be noted that the transmission of the AAI_HO-IND message is optional.

General handover (HO) procedures will hereinafter be described with reference to FIGS. 9(a) to 9(c).

Figure 9:
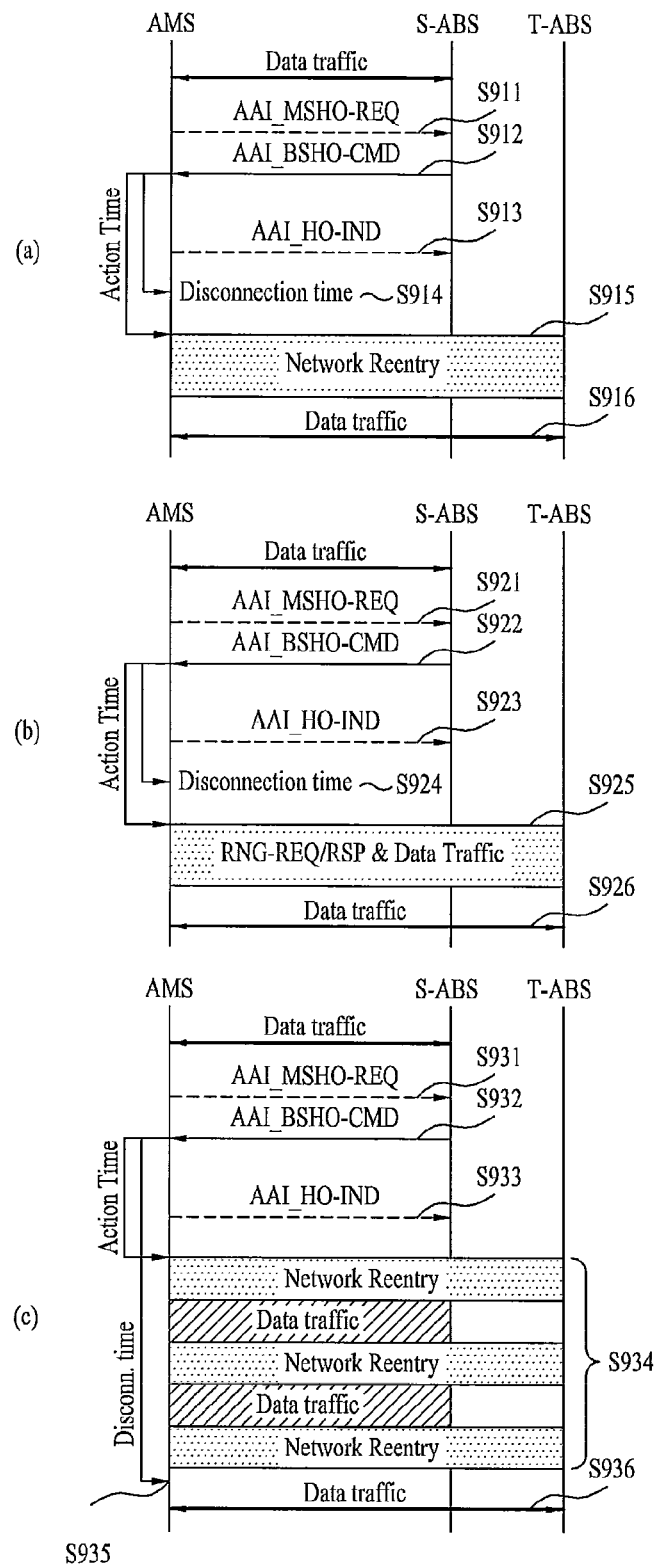
FIGS. 9(a), 9(b) and 9(c) illustrate general handover procedures.

FIG. 9(a) shows a hard handover (HO) procedure. Referring to FIG. 9(a), according to either a handover request (AAI_MSHO-REQ) message (S911) received from the AMS or an unsolicited scheme, the serving ABS (S-ABS) transmits a handover command (AAI_BSHO-CMD) message to the AMS at step S912. In response to the AAI_BSHO-CMD message, the AMS may transmit the AAI_HO-IND message to the serving ABS (S-ABS) at step S913. The AMS performs a network re-entry procedure to a target ABS (T-ABS) at an action time specified by the AAI_BSHO-CMD message at step S915. In the hard handover (HO) procedure, the AMS may sever the connection to the serving ABS (S-ABS) before performing the network re-entry procedure (S915) to the target ABS (T-ABS) at step S914. After the completion of the network re-entry procedure, the AMS may exchange data traffic with the target ABS (T-ABS) at step S916.

FIG. 9(b) shows a seamless handover (HO) procedure. The seamless handover (HO) means a specific handover in which a Quality of Service (QoS) provided before the execution of handover (HO) is maintained without any change and at the same time that a necessary handover (HO) is performed. According to either a handover request (AAI_MSHO-REQ) message (S921) received from the AMS or the unsolicited scheme, the serving ABS (S-ABS) may transmit a handover command (AAI_BSHO-CMD) message to the AMS at step S922. In response to the AAI_BSHO-CMD message, the AMS may transmit the AAI_HO-IND message to the serving ABS (S-ABS) at step S923. The AMS may sever the connection to the serving ABS (S-ABS) at a disconnection time at step S924. The AMS may exchange ranging request (RNG-REQ)/ranging response (RNG-RSP) messages with the target ABS (T-ABS) at an action time specified by the AAI-BSHO-CMD message at step S925, and may exchange traffic with the target ABS (T-ABS) at step S926.

FIG. 9(c) shows an Establish Before Break (EBB) handover (HO) procedure. According to either a handover request (AAI_MSHO-REQ) message (S931) received from the AMS or an unsolicited scheme, the serving ABS (S-ABS) transmits a handover command (AAI_BSHO-CMD) message to the AMS at step S932. In response to the AAI_BSHO-CMD message, the AMS may transmit a handover indication (AAI_HO-IND) message to the serving ABS (S-ABS) at step S933. The AMS performs network re-entry to the target ABS (T-ABS) at an action time defined by the AAI_BSHO-CMD message, and at the same time continuously communicates with the serving ABS (S-ABS) at step S934. Upon completion of the network re-entry to the target ABS (T-ABS), the AMS may be disconnected from the serving ABS (S-ABS) at a disconnection time at step S935. After the completion of the network re-entry procedure, the AMS may exchange data traffic with the target ABS (T-ABS) at step S936.

On the other hand, if the AMS supports multiple carriers as previously stated in FIG. 2(b), a plurality of FAs (carriers) may be controlled by a single common MAC. If the plurality of FAs (carriers) is controlled by a single common MAC, a single Base Station Identifier (BSID) may be assigned to a plurality of frequency channels. In relation to the above description, there may be considered an exemplary case in which a single carrier supported AMS (i.e., an AMS capable of exchanging data with an ABS by a single MAC-PHY entity during an arbitrary TTI) receives a necessary service through one of carriers controlled by a common MAC such that it may be necessary for the single carrier supported AMS to perform handover (HO) to another carrier controlled by the common MAC due to variation in load balancing or channel quality. The handover (HO) of the single carrier supported AMS may also be carried out through the same procedure as in the above-mentioned inter-frequency handover (HO). However, one embodiment of the present invention proposes a simpler handover scheme on the basis of the fact that handover (HO) of the single carrier supported AMS is an inter-carrier handover (HO) controlled by a common MAC, such that the exchange of unnecessary information (e.g., a network re-entry procedure) is omitted in a similar manner to a primary carrier change performed by the multi-carrier supported AMS.

In a single carrier supported AMS operated in the conventional multi-carrier system, a handover (HO) procedure in which network re-entry is omitted is not yet defined. Therefore, when all the single carrier supported AMSs perform handover (HO), the single carrier supported AMSs must perform a minimum number of network re-entry procedures (e.g., the exchange of RNG-REQ/RSP messages) at an action time indicated by the AAI_HO-CMD message. However, as defined in the primary carrier change of the multi-carrier (MC) operation, a process such as a network re-entry process may be omitted from handover (HO) between common MAC carriers of the single carrier supported AMS. All the carriers controlled by the common MAC are controlled by a single ABS, such that a value such as a station identifier (STID) need not be allocated during the inter-carrier handover (HO), and other procedures such as authentication and the like may be omitted. Therefore, efficient handover (HO) that is easier than the conventional inter-frequency handover (HO) can be carried out.

Common MAC Handover (HO) of Single Carrier Supported AMS According to Handover (HO) Procedure FIGS. 10(a), 10(b) and 10(c) illustrate common MAC handover (HO) procedures of a single carrier AMS through a handover (HO) procedure according to one embodiment of the present invention. Various embodiments illustrating that a single carrier supported AMS performs inter-carrier handover (HO) controlled by a common MAC will hereinafter be described with reference to FIGS. 10(a), 10(b) and 10(c).

The term 'common MAC handover' described in the present invention means a carrier change in which one carrier (i.e., a serving carrier) controlled by a common MAC is changed to another carrier (i.e., a target carrier) controlled by the same MAC as the common MAC, and briefly represents handover (HO) between carriers controlled by a single common MAC entity.

Common MAC handover having no network re-entry will hereinafter be described with reference to FIG. 10(a). Referring to FIG. 10(a), according to either a handover request (AAI_MSHO-REQ) message (S1011) from a single carrier supported AMS or an unsolicited scheme, the ABS can transmit a handover command (AAI_BSHO-CMD) message to the AMS through a serving carrier (S-carrier) at step S1012. In response to the AAI_BSHO-CMD message, the single carrier supported AMS may transmit a handover indication (AAI_HO-IND) message to the serving ABS (S-ABS) at step S1013. The single carrier supported AMS may be disconnected from the ABS through the serving carrier (S-carrier) at a disconnection time defined by the AAI_BSHO-CMD message at step S1014.

The target carrier (T-carrier) is arranged along with the serving carrier (S-carrier) and the T-carrier and the S-carrier are controlled by the same common MAC, such that the ABS is able to pre-recognize all of MAC-associated information of the AMS managed through the single MAC. Therefore, transmission and reception of MAC-level ranging request/response (RNG-REQ/RSP) messages that need to be minimally carried out between a target ABS (T-ABS) and the AMS may be omitted from the network re-entry procedure. Accordingly, according to this embodiment of the present invention, the single carrier supported AMS having received the AAI_BSHO-CMD message can directly perform handover (HO) at an action time defined by AAI_BSHO-CMD message and can exchange data with the ABS at step S1015. In association with the above description, it is necessary for the single carrier supported AMS to recognize the fact that a target carrier (T-carrier) is a carrier contained in the same common MAC as that of the serving carrier (S-carrier) prior to the beginning of the action time, and such recognition information may be transmitted to the AMS through either the AAI_BSHO-CMD message or the neighbor advertisement (AAI_NBR-ADV) message.

One embodiment that uses the AAI_HO-IND message as a confirmation message (also called a 'confirm message') will hereinafter be described with reference to FIG. 10(b). Referring to FIG. 10(b), according to either a handover request (AAI_MSHO-REQ) message (S1021) received from the single carrier supported AMS or an unsolicited scheme, an ABS can transmit a handover command (AAI_BSHO-CMD) message to the AMS through a serving carrier (S-carrier) at step S1022. After receiving the AAI_BSHO-CMD message from the ABS, the AMS may be disconnected from the ABS through the serving carrier (S-carrier) at a disconnection time at step S1023.

As previously stated above, the AAI_HO-IND message for use in the conventional handover procedure is optional, such that it may not be transmitted from the AMS to the ABS. In this case, assuming that no ranging request (RNG-REQ) message is received from the AMS as described in the above-mentioned embodiment, the AMS may immediately be handed over to the target carrier (T-carrier) without transmitting a MAC-level confirmation message associated with the AAI_BSHO-CMD message to the ABS. In this case, assuming that the handover command (AAI_BSHO-CMD) message is damaged or lost, the loss of data may unavoidably occur.

Thus, in order to allow the ABS to confirm the completion of AMS handover, a confirmation message may be transmitted from the AMS to the ABS. For the confirmation message, in the case where the single carrier supported AMS performs the common MAC handover (HO), the AMS may transmit the AAI_HO-IND message as a response to the AAI_BSHO-CMD message to the ABS through the T-carrier (instead of the S-carrier) after the lapse of the action time at step S1024. In association with the above description, in order to allow the AMS to transmit the AAI_HO-IND message to the ABS through the target carrier (T-carrier), an uplink (UL) grant from the ABS must be present at an action time. The ABS having received the AAI_HO-IND message through the target carrier (T-carrier) assumes that the single carrier supported AMS has successfully performed the common MAC handover (HO), such that the ABS can transmit and receive data to and from the ABS through the target carrier (T-carrier) at step S1025.

Figure 10:
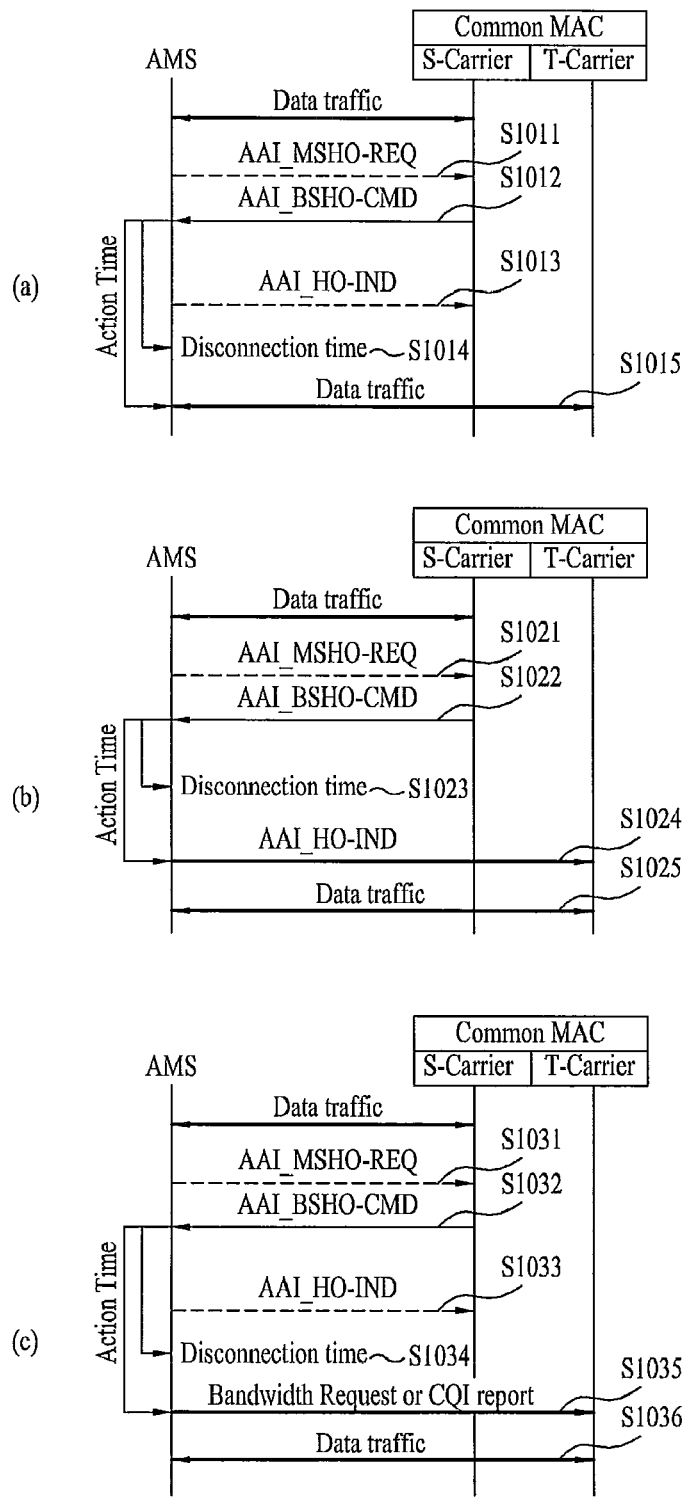
FIGS. 10(a), 10(b) and 10(c) illustrate common MAC handover procedures of a single-carrier mobile station (MS) through a handover procedure according to one embodiment of the present invention.

A handover (HO) procedure that uses a Bandwidth Request (BR) or a CQI allocation/report will hereinafter be described with reference to FIG. 10(*c*). Referring to FIG. 10(*c*), according to either an AAI_MSHO-REQ message (S1031) received from the single carrier supported AMS or an unsolicited scheme, the ABS can transmit a handover command (AAI_B-SHO-CMD) message to the AMS through the serving carrier (S-carrier) at step S1032. In response to the AAI_BSHO-CMD message, the single carrier supported AMS may transmit the AAI_HO-IND message to the serving ABS (S-ABS) at step S1033. The single carrier supported AMS may be disconnected from the ABS through the serving carrier (S-carrier) at a disconnection time defined by the AAI_B-SHO-CMD message at step S1034.

In accordance with the embodiment of the present invention, the AMS may optionally transmit the AAI_HO-IND message in the same manner as in the conventional handover (HO) procedure at step S1033. On the other hand, in order to confirm no loss of the AAI_HO-CMD message, the AMS for use in the embodiment of the present invention transmits a Bandwidth Request (BR) through the target carrier (T-carrier) at an action time at step S1035, whereas the AMS for use in the conventional handover (HO) procedure transmits a ranging request (RNG-REQ) message instead of the BR through the target carrier (T-carrier) at such an action time.

Otherwise, in the case where the CQI report is used as a confirmation message, so as to allow the AMS to transmit the CQI report to the ABS, the ABS can allocate a CQI channel (CQICH) to the AMS through the target carrier (T-carrier) at the action time. The AMS can transmit the CQI report through the CQICH allocated by the ABS at step S1035. The ABS receives the CQI report through the target carrier (T-carrier), such that it can recognize that the AMS has successfully performed handover (HO).

If the ABS receives the BR or the CQI report from the AMS through the target carrier (T-carrier), the ABS can recognize that the AMS was successfully handed over to the target carrier (T-carrier), and can transmit and receive data to and from the AMS through the target carrier (T-carrier) at step S1036.

Figure 11:
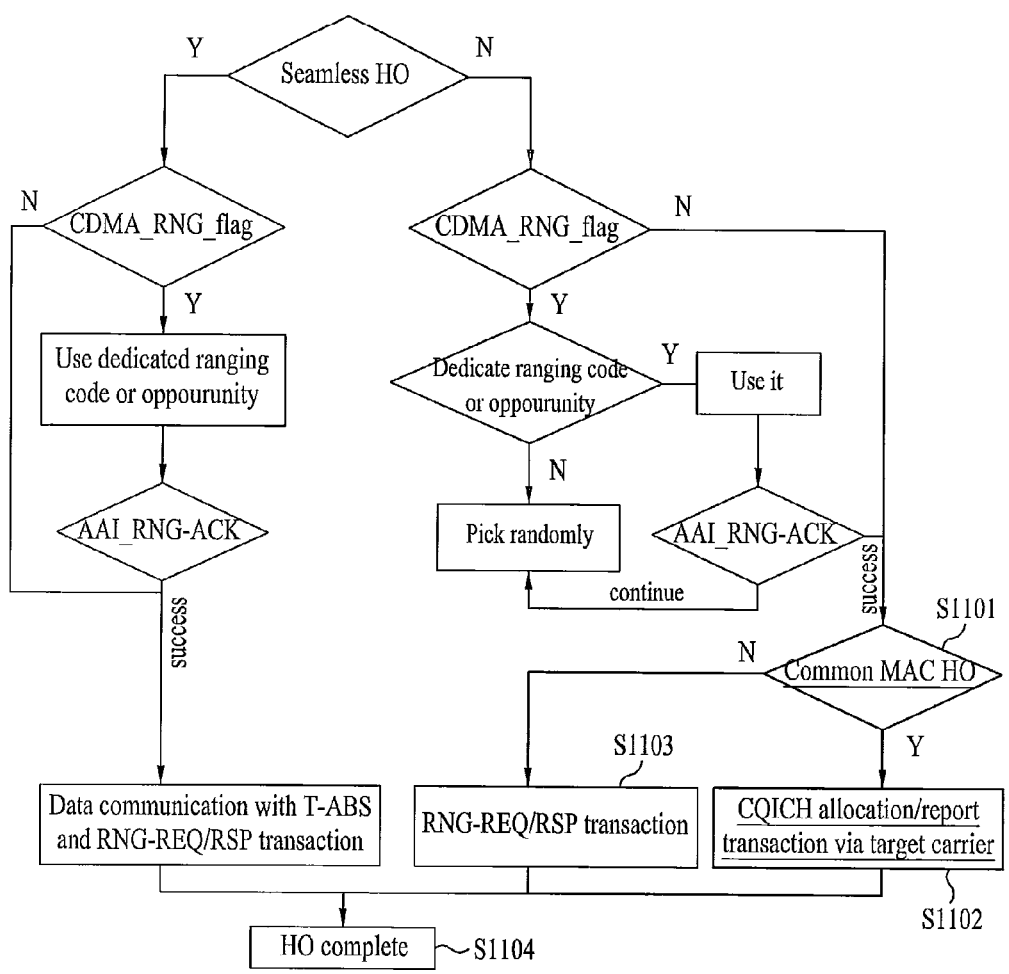
FIG. 11 is a flowchart illustrating mobile station (MS) operation during network re-entry from among a common MAC handover according to one embodiment of the present invention.

The AMS operation during the network re-entry from among the common MAC handover (HO) procedure will hereinafter be described with reference to FIG. 11. FIG. 11 illustrates additional AMS operations for use in a common MAC handover that is applied to previous AMS operations for use in the conventional handover (HO) network re-entry procedure. As described above, a simpler handover in which a network re-entry process is omitted is applied to the common MAC handover (HO) process, and CQICH allocation performed by the target ABS (T-ABS) and a CQI report of the AMS are used such that no loss of the AAI_HO-CMD message can be confirmed. As shown in FIG. 11, if the inter-frequency handover (HO) occurs in the common MAC at step S1101, the target ABS (T-ABS) allocates a CQICH for the AMS through the target carrier (T-carrier) at an action time defined by the AAI_HO-CMD message, and the AMS can report a CQI for the target carrier (T-carrier) at step S1102. During the common MAC handover (HO), transmission and reception of the AAI_RNG-REQ/RSP messages may be omitted at step S1103. If the target ABS (T-ABS) receives the CQI report, the handover (HO) procedure can be completed at step S1104.

Hereinafter, one embodiment in which the single carrier supported AMS performs common MAC handover (HO) using the handover command (AAI_HO-CMD) message will be described in detail.

A conventional AAI_HO-CMD message can be defined as the following three modes 0b00, 0b01 and 0b11.
  0b00: Handover (HO) Command
  0b01: Zone Switch Command from MZone to LZone
  0b11: AMS HO request rejected (AMS in list unavailable)
  Mode 0b00
  In the case of the first mode 0b00, the AAI_HO-CMD message includes one or more target ABSs (T-ABSs) and the following parameters. These parameters are as follows.
    Handover Re-entry Mode (HO_Reentry_Mode), Disconnect Time Offset, and Resource Retain Time (Resource_Retain_Time)
  The following parameters are contained in each target ABS (T-ABS), and a detailed description thereof is as follows.
    Target ABS ID, Action Time, CDMA ranging flag (CDMA_RNG_FLAG), HO Process Optimization, Ranging Initiation Deadline, and Service Level Prediction
  The following parameter is contained in each ABS serving as a multi-carrier supported ABS, and a detailed description thereof is as follows.
    Physical Carrier Index (Physical_Carrier_Index)
  The following parameter is contained in an AMS having the multi-carrier capability.
    Multi-Carrier Handover Indication (MCHO_Indication)
  Mode 0b01
  In the case of the second mode 0b01, the AAI_HO-CMD message that is used as a zone switch command from an MZone (i.e., a zone for supporting a new MS according to the IEEE 802.16m standard) to an LZone (i.e., a zone for supporting a legacy MS according to the IEEE 802.16e standard) includes the following parameters. These parameters are as follows.
    HO Re-entry Mode (HO_Reentry_Mode), Action Time, Resource Retain Time (Resource_Retain_Time), CDMA Ranging Flag (CDMA_RNG_FLAG), and LZone information
  Mode 0b11
  In the case of the third mode 0b11, the AAI_HO-CMD message does not include information on any target ABSs.

In accordance with one embodiment of the present invention, the common MAC handover (HO) may be indicated through the HO process optimization field defined in the AAI_HO-CMD message of the first mode 0b00.

In association with the above description, the HO process optimization field for use in the conventional AAI_HO-CMD message can be defined as follows.
  For each bit location, a value of '0' indicates that a related re-entry management message is required, and a value of '1' indicates that a re-entry MAC control message may be omitted.
  Bit #0: Omission of AAI_SBC-REQ/RSP MAC control messages during re-entry processing
  Bit #1: Omission of a PKM authentication phase except a TEK phase during current re-entry processing
  Bit #2: Seamless HO
  Bit #3: To Be Determined (TBD)
  In this embodiment of the present invention, Bit#3, undefined in the HO processing optimization field, can be defined as follows.

Bit #3: Omission of AAI_RNG-REQ/RSP messages during common MAC handover (HO) or re-entry processing The AMS that receives the AAI_HO-CMD message including the HO processing optimization field in which Bit#3 is set to '1', can recognize that a commanded handover (HO) is a common MAC handover (HO).

On the other hand, since all the frequency channels controlled by the common MAC use the same BSID, the AMS confirms that a target carrier (T-carrier) has the same BSID as that of a serving carrier (S-carrier), such that it can recognize the presence or absence of the common MAC handover (HO). In association with the above description, the AMS may pre-recognize a BSID of the corresponding carrier through a multi-carrier advertisement (AAI_MC-ADV) message broadcast from the ABS or a neighbor advertisement (AAI_NBR-ADV) message. Therefore, if the target carrier (T-carrier) specified by the handover command (AAI_HO-CMD) message received in the AMS has the same BSID as that of the serving carrier (S-carrier), the AMS can implicitly recognize that the handover (HO) commanded by the AAI_HO-CMD message is a common MAC handover.

In accordance with another embodiment of the present invention, a carrier change command mode may be additionally defined in the above-mentioned AAI_HO-CMD message. In other words, the AAI_HO-CMD message may be defined to have the following four modes 0b00, 0b01, 0b10, and 0b11.

0b00: HO Command
0b01: Zone Switch Command from MZone to LZone
0b10: Carrier Change Command
0b11: AMS HO request rejected (AMS in list unavailable)
Mode 0b10

In the case of the third mode 0b10, the AAI_HO-CMD message may have the following parameters. These parameters are as follows.

Physical_Carrier_Index of target carrier
Disconnection Time (e.g., this parameter may be set to a specific time at which connection to a serving carrier (S-carrier) may be severed)
Action time (e.g., this parameter may be set to a transmission time of a confirmation message indicating successful carrier change to a target carrier (T-carrier))
CDMA_RNG_FLAG
Dedicated CDMA ranging code/opportunity (this parameter may be used when a CDMA_RNG_FLAG field is set to '1')

A method for allowing a single carrier supported AMS to perform common MAC handover (HO) using the above-mentioned handover command (AAI_HO-CMD) message according to one embodiment of the present invention will hereinafter be described with reference to FIG. 12.

Figure 12:
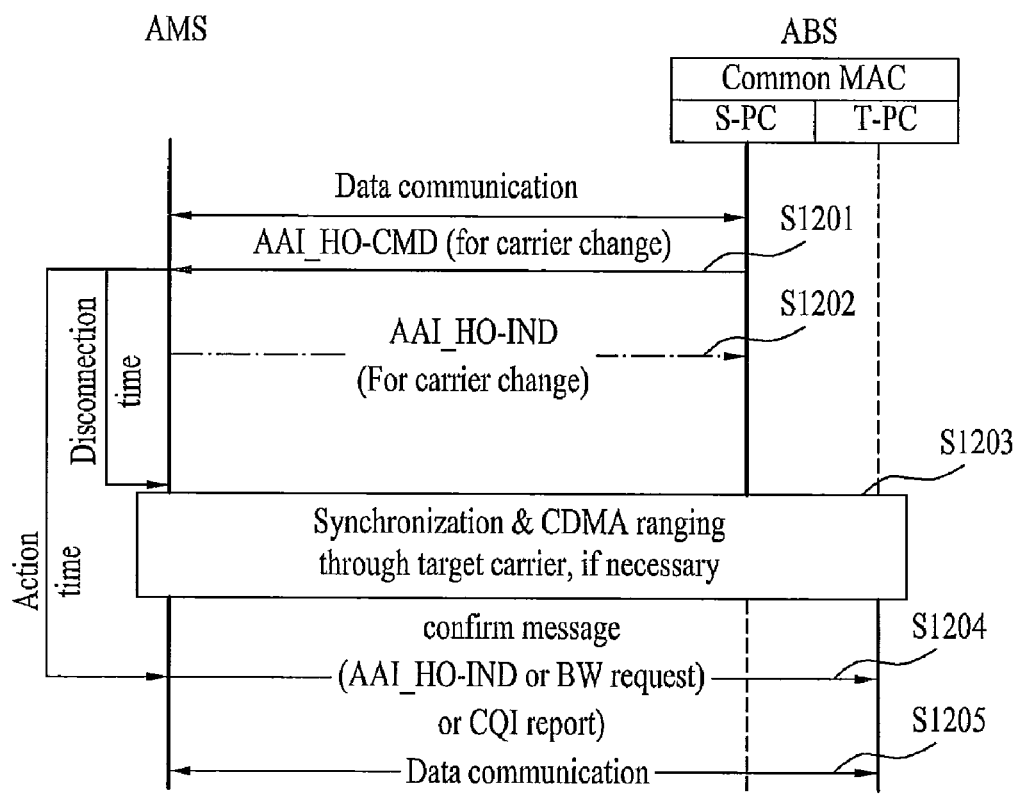
FIG. 12 is a flowchart illustrating common MAC handover procedures of a single-carrier MS through a handover procedure according to one embodiment of the present invention.

Referring to FIG. 12, the AMS can receive the AAI_HO-CMD message having the mode of 0b01 from the ABS at step S1201. The AMS may transmit the AAI_HO-IND message to the ABS through the serving carrier (S-carrier) upon receiving the AAI_HO-CMD message from the ABS at step S1202. On the other hand, in the case where a handover indication (AAI_HO-IND) message serving as a confirmation message for indicating successful handover (HO) to a target carrier (T-carrier) is transmitted through the target carrier (T-carrier), the transmission of the AAI_HO-IND message through the serving carrier (S-carrier) may be omitted as necessary.

The AMS is disconnected from the serving carrier (S-carrier) at a disconnection time defined by the AAI_HO-CMD message. If necessary, the AMS may perform synchronization and ranging (CDMA ranging or periodic ranging) through the target carrier (T-carrier) at step S1203. Assuming that the disconnection time is not defined, the connection to the serving carrier (S-carrier) may be severed at an action time, and the confirmation message may be transmitted through the T-carrier.

The AMS may transmit a confirmation message (AAI_HO-IND, BR or CQI report) through the target carrier (T-carrier) at the action time defined by the AAI_HO-CMD message at step S1204. Through the confirmation message, the ABS can confirm the successful carrier change of the AMS. After the completion of transmission/reception of the confirmation message, the AMS can transmit and receive data to and from the ABS through the target carrier (T-carrier) at step S1205.

Figure 13:
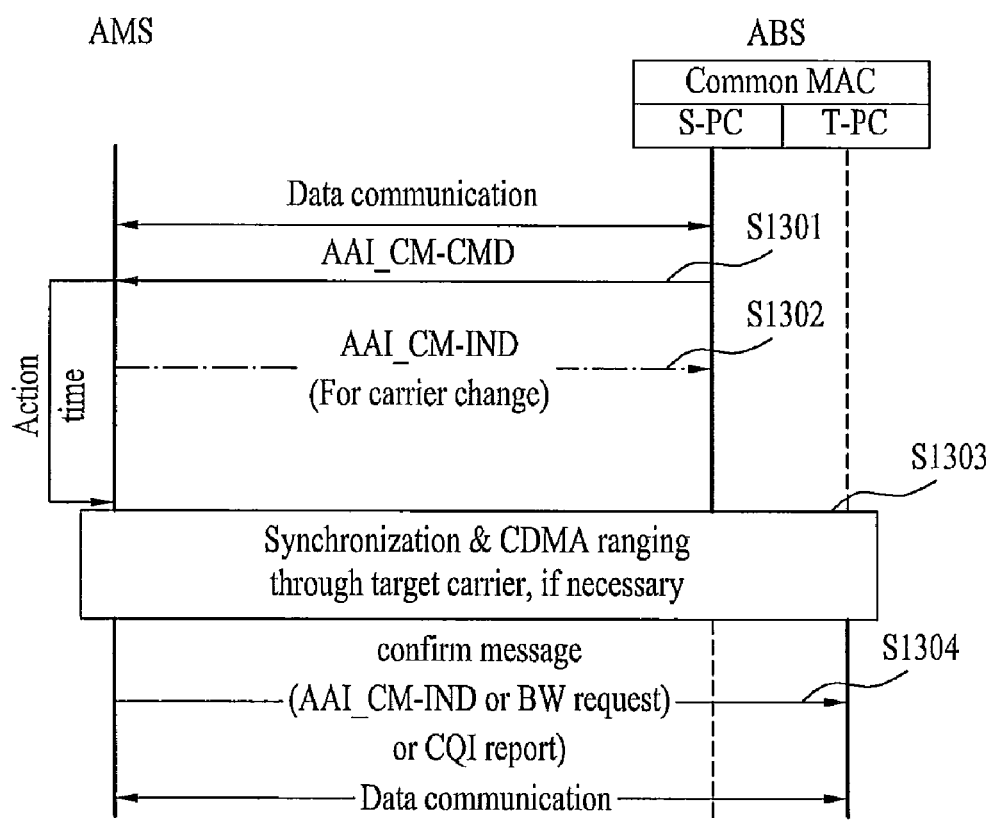
FIG. 13 is a flowchart illustrating common MAC handover procedures of a single-carrier MS through a multi-carrier associated MAC control message according to one embodiment of the present invention.

Common MAC Handover (HO) of Single Carrier AMS According to Carrier Management Procedure FIG. 13 is a flowchart illustrating common MAC handover (HO) procedures of a single carrier AMS through a multi-carrier associated MAC control message according to one embodiment of the present invention. One embodiment wherein a single carrier AMS performs a carrier change procedure by interpreting a multi-carrier associated MAC control message will hereinafter be described with reference to FIG. 13.

The common MAC handover (HO) procedures described in FIG. 10 illustrate various embodiments to be used when a single carrier AMS does not receive/interpret a multi-carrier associated MAC message, such that the inter-frequency handover (HO) among carriers controlled by the common MAC can be more easily performed than the conventional HO procedure using the AAI_HO-CMD/IND messages.

On the other hand, the single carrier AMS may also have the capability to receive and interpret a multi-carrier associated MAC control message. As previously described in Table 1, in the case where the single carrier AMS has a multi-carrier capability of a basic multi-carrier (MC) mode, this means that the AMS can be aware of the ABS multi-carrier (MC) operation (that includes primary carrier change and the support of MC operation associated optimization scanning). Such AMS capability may be transferred to the ABS through the AAI_REG-REQ message that is transmitted from the AMS to the ABS during the initial network entry procedure.

In the case of the single carrier AMS, a carrier of the AMS can be easily changed (or handed over) to one of the fully configured carriers controlled by the common MAC through the multi-carrier associated MAC control message (e.g., AAI_CM-CMD message). However, the single carrier AMS is simultaneously unable to employ a plurality of carriers differently from the multi-carrier AMS, such that one embodiment of the present invention proposes a new procedure different from the primary carrier change procedure of the multi-carrier (MC) operation.

As described above, the carrier management command (AAI_CM-CMD) message is a MAC control message that is used by the multi-carrier supported AMS so as to achieve not only secondary carrier management (activation/deactivation) but also primary carrier change. In the meantime, in the case of a single carrier AMS having the multi-carrier capability serving as a basic multi-carrier (MC) mode, the AMS can receive physical indexes and setup information of all the available carriers supported by the ABS through a multi-carrier advertisement (AAI_MC-ADV) message broadcast from the ABS supporting multiple carriers. That is, the single carrier AMS supporting the basic MC mode can be aware of information about all the carriers belonging to a cell that is currently receiving the service. As previously stated in the definition of 'Basic MC mode', the single carrier AMS can receive the AAI_CM-CMD message from the ABS, and can recognize an exemplary case in which the action code of the AAI_CM-CMD message is set to '1' (That is, the case of primary carrier change). Therefore, the single carrier AMS supporting the basic MC mode can perform the carrier change procedure among carriers controlled by the common MAC through the AAI_CM-CMD message.

Although the single carrier AMS supports the basic MC mode, it is configured to monitor only one carrier at an arbitrary time point, such that it is impossible for the carrier change procedure, that is performed after the T-carrier activation in the same manner as in the primary carrier change procedure of the multi-carrier AMS, to be applied to the single carrier AMS.

In accordance with the embodiment of the present invention, the serving ABS (S-ABS) can transmit the AAI_CM-CMD control message to the AMS through a current serving carrier (S-carrier) such that the AMS performs carrier change to one of the available fully configured carriers belonging to the serving ABS (S-ABS) in response to the AAI_CM-CMD control message. The assigned carrier cannot be assigned to the single carrier AMS, such that the target carrier (T-carrier) must be indicated as one of the available fully configured carriers. If the single carrier AMS receives the AAI_CM-CMD message, it severs the control connection through the serving carrier (S-carrier) and may perform carrier change to a target fully configured carrier at an action time specified by the ABS. The single carrier AMS can communicate with the ABS through only one carrier at an arbitrary time, such that it is necessary for the connection on the S-carrier to first be severed, such that the single carrier AMS can communicate with the ABS through the target carrier (T-carrier). In addition, in the case where the ranging indicator or the dedicated CDMA ranging flag is established in the AAI_CM-CMD message, the AMS can perform periodic ranging or dedicated ranging through the target carrier (T-carrier).

A method for controlling the single carrier AMS to perform a carrier change procedure using the AAI_CM-CMD/IND messages according to one embodiment of the present invention will hereinafter be described with reference to FIG. 13. Referring to FIG. 13, the single carrier AMS can receive the AAI_CM-CMD message corresponding to the primary carrier change having the action code of 1 from the ABS at step S1301. In reference to the single carrier AMS, a target carrier (T-carrier) specified by the AAI_CM-CMD message may be defined to be a physical carrier index. The single carrier AMS does not receive the assigned carrier from the ABS differently from the multi-carrier AMS, such that the logical carrier index indicating the assigned carrier is unable to be used for the single carrier AMS. Otherwise, in order to indicate the target carrier (T-carrier) for all the AMSs, a physical carrier index may be used. In the meantime, a T-carrier indicator for use in the multi-carrier supported AMS may be one of the assigned fully configured carriers, and a logical carrier index may be used.

The AMS may transmit the AAI_CM-IND message in response to the AAI_CM-CMD message at step S1302. However, in the case where the AAI_CM-IND message is used as a confirmation message for carrier change confirmation, the transmission of the AAI_CM-IND message through the S-carrier may be omitted as necessary.

The AMS is disconnected from the serving carrier (S-carrier) at an action time specified by the AAI_CM-CMD message, and may perform synchronization and ranging (CDMA dedicated ranging or periodic ranging) through the target carrier (T-carrier) as necessary, such that it can establish the connection to the ABS through the target carrier (T-carrier) at step S1303. In this case, a disconnection time from the serving carrier (S-carrier) is not additionally established and the AMS decides the action time to be the disconnection time, such that the AMS may sever the connection to the serving carrier (S-carrier). Upon successful completion of synchronization and ranging, the AMS transmits the AAI_CM-IND message through the target carrier (T-carrier) or transmits a Bandwidth Request (BW Request) or a CQI report through the target carrier (T-carrier), such that it can inform the ABS of the successful carrier change at step S1304.

In reference to the above description, a 'Next State of Serving Primary Carrier' field of a serving primary carrier (S-PC) from among fields contained in the AAI_CM-CMD message represents that an activation status of a serving carrier (S-carrier) is changed to a deactivation status (i.e., value: 0) after the primary carrier change or the serving carrier (S-carrier) activation status is maintained (i.e., value: 1) after the primary carrier change. In reference to the single carrier AMS, the 'Next State of Serving Primary Carrier' field may be used as a ranging indicator field. If the ranging indicator field is set to '0', this means that the ranging for the target carrier (T-carrier) is no longer required. In addition, if the ranging indicator field is set to '1', this means that the periodic ranging of the target carrier (T-carrier) is required.

In contrast, the single carrier AMS not supporting carrier aggregation can communicate with the ABS through only one carrier, such that the serving carrier (S-carrier) should always be deactivated upon completion of carrier change. Therefore, in accordance with one embodiment of the present invention, the 'Next State of Serving Primary Carrier' field may always be set to zero '0' indicating a deactivation status. In this case, the ranging indicator field may be defined as an additional field.

Instead of performing the periodic ranging through the ranging indicator, a field for performing the dedicated ranging through CDMA code/opportunity may be additionally defined in the AAI_CM-CMD message. In this case, a CDMA ranging flag (CDMA_RNG_FLAG) field may also be defined in the AAI_CM-CMD message. If the CDMA_RNG_FLAG field for the target carrier (T-carrier) is set to '0', this means that ranging is not required. If the CDMA_RNG_FLAG field for the target carrier (T-carrier) is set to '1', this means that the dedicated ranging for the target carrier (T-carrier) is required. If the CDMA_RNG_FLAG field is set to '1', the dedicated CDMA ranging code/opportunity field may be contained in the AAI_CM-CMD message.

In accordance with this embodiment of the present invention, the common MAC handover (HO) of the single carrier AMS can be carried out through the field contained in the currently defined AAI_CM-CMD message. Otherwise, in the case where the multi-carrier supported AMS has a limitation in simultaneously employing the serving carrier (S-carrier) and the target carrier (T-carrier) for the primary carrier change, the primary carrier change may be carried out through the same procedures as those of the present invention.

Some parameters of the AAI_CM-CMD message according to this embodiment of the present invention may be defined by the following Table 13.

TABLE 13

| Field | Size (bit) | Description |
|---|---|---|
| ... | | |
| If (Action code == 1){ | | This message is for primary carrier change. |
|   Target carrier index | [TBD] | Target carrier index for primary carrier change |
| | | If AMS only supports single carrier, this shall refer to the physical carrier index |
|   Action Time | [TBD] | LSB bits of Superframe number at the time to switch to the target carrier |
| | | This value shall be set to the value more than the retransmission time for AAI_CM-CMD message |
| | | AMS disconnects connection with serving carrier and performs synchronization and/or CDMA ranging procedure with target carrier at this time. |
|   If (AMS == multicarrier supported AMS){ | 1 | '0': Serving carrier will be deactivated after primary carrier change |
|     Next state of serving primary carrier | | '1': Serving carrier is kept active after primary carrier change |
|   } | | |
|   If (AMS == single carrier supported AMS){ | | If AMS only supports single carrier, this field is used as 'ranging indicator' |
|     Ranging indicator | | Ranging indicator for target carrier |
|   } | | '0': No ranging is required for the target carrier |
| | | '1': Periodic ranging is required for the target carrier |
| } | | |
| ... | | |

Assuming that the T-carrier for the primary carrier change is always indicated by a physical carrier index and the ranging indicator field is separately defined, some parameters of the AAI_CM-CMD message may be defined by the following Table 14.

TABLE 14

| Field | Size (bit) | Description |
|---|---|---|
| ... | | |
| If (Action code == 1){ | | This message is for primary carrier change. |
|   Physical carrier index of Target carrier index | 6 | Physical carrier index of target carrier index for primary carrier change |
| | | If the AMS supports multicarrier operation, the carrier shall be one of the assigned carriers. |
|   Action Time | 3 | LSB bits of Superframe number at the time to switch to the target carrier |
| | | This value shall be set to the value more than the retransmission time for AAI_CM-CMD message |
| | | AMS disconnects connection with serving carrier and performs synchronization and/or CDMA ranging procedure with target carrier at this time. |
|   Next state of serving primary carrier | 1 | '0': Serving carrier will be deactivated after primary carrier change; If the AMS does not support carrier aggregation, this field shall be always set to '0' |
| | | '1': Serving carrier is kept active after primary carrier change |
|   Ranging indicator | 1 | Ranging indicator for target carrier |
| | | '0': No ranging is required for the target carrier |
| | | '1': Periodic ranging is required for the target carrier |
| } | | |
| ... | | |

Otherwise, instead of performing the periodic ranging through the ranging indicator, a field for performing the dedicated ranging through CDMA code/opportunity may be additionally defined in the AAI_CM-CMD message. In this case, a CDMA ranging flag (CDMA_RNG_FLAG) field may also be defined in the AAI_CM-CMD message. If the CDMA_RNG_FLAG field for the target carrier (T-carrier) is set to '0', this means that ranging is not required. If the CDMA_RNG_FLAG field for the target carrier (T-carrier) is set to '1', this means that the dedicated ranging for the target carrier (T-carrier) is required. If the CDMA_RNG_FLAG field is set to '1', the dedicated CDMA ranging code/opportunity field may be contained in the AAI_CM-CMD message. In this case, some parameters of the AAI_CM-CMD message may be defined by the following Table 15.

TABLE 15

| Field | Size (bit) | Description |
|---|---|---|
| ... | | |
| If (Action code == 1){ | | This message is for primary carrier change. |
|   Physical carrier index of Target carrier index | 6 | Physical carrier index of target carrier index for primary carrier change<br>If the AMS supports multicarrier operation, the carrier shall be one of the assigned carriers. |
|   Action Time | 3 | LSB bits of Superframe number at the time to switch to the target carrier<br>This value shall be set to the value more than the retransmission time for AAI_CM-CMD message<br>AMS disconnects connection with serving carrier and performs synchronization and/or CDMA ranging procedure with target carrier at this time. |
|   Next state of serving primary carrier | 1 | '0': Serving carrier will be deactivated after primary carrier change; If the AMS does not support carrier aggregation, this field shall be always set to '0'<br>'1': Serving carrier is kept active after primary carrier change |
|   CDMA_RNG_FLAG | 1 | CDMA Ranging flag for target carrier<br>'0': No ranging is required for the target carrier<br>'1': Dedicated ranging is required for the target carrier |
|   If (CDMA_RNG_FLAG == 1){<br>    Dedicated CDMA ranging code/opportunity<br>  }<br>}<br>... | [TBD] | These parameters may be included when CDMA_RNG_FLAG = 1 |

Procedures for controlling the single carrier AMS to perform a common MAC handover (HO) using the carrier management control message according to one embodiment of the present invention will hereinafter be described with reference to FIG. 14.

Figure 14:
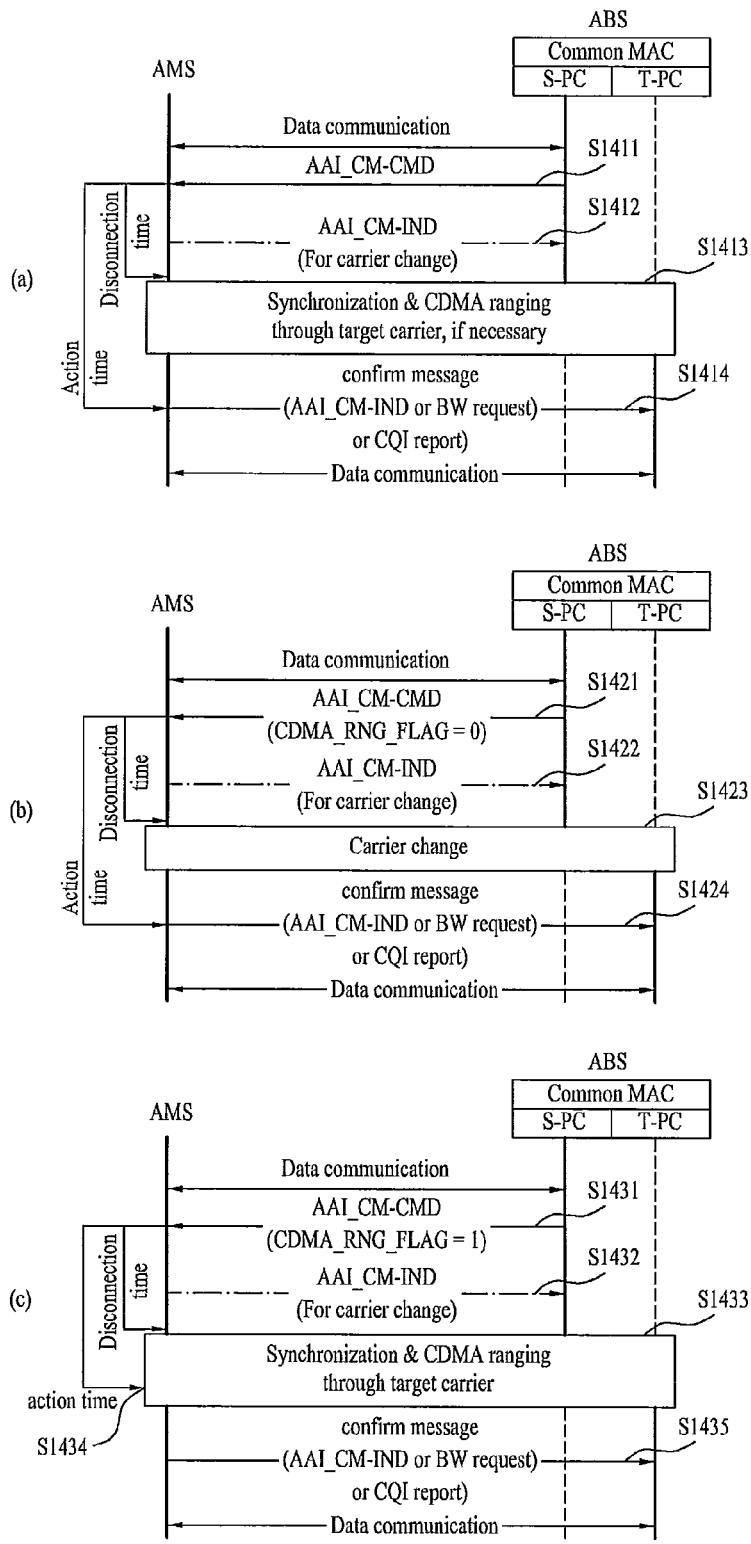
FIGS. 14(a), 14(b) and 14(c) illustrate common MAC handover procedures of a single-carrier MS using a multi-carrier associated MAC control message according to another embodiment of the present invention.

In the procedure shown in FIG. 14(*a*), if the AAI_CM-CMD message is adapted to perform a carrier change of the single carrier AMS, an action code indicating the carrier change from among action codes of the AAI_CM-CMD message may be newly defined as, for example '11'. In response to such an action code, the single carrier AMS can be aware of a carrier change and can perform a necessary action associated with the recognized carrier change.

Referring to FIG. 14(*a*), the single carrier AMS can receive the AAI_CM-CMD message corresponding to the carrier change having an action code '11' from the ABS at step S1411. In the case of the action code '11', the AAI_CM-CMD message may include a target carrier index, a disconnection time, an action time, and a ranging indicator.

In reference to the single carrier AMS, the target carrier (T-carrier) specified by the AAI_CM-CMD message may represent a physical carrier index. The AMS may transmit the AAI_CM-IND message in response to the AAI_CM-CMD message at step S1412. However, in the case where the AAI_CM-IND message is used as a confirmation message for carrier change confirmation, the transmission of the AAI_CM-IND message through the serving carrier (S-carrier) may be omitted as necessary.

The AMS severs the connection to the serving carrier (S-carrier) at a disconnection time specified by the AAI_CM-CMD message, and may perform synchronization and ranging through the target carrier (T-carrier) as necessary at step S1413. If the disconnection time is not defined, similar to the above-mentioned embodiment, the AMS severs the connection to the serving carrier (S-carrier) at an action time specified by the AAI_CM-CMD message, and may perform synchronization and ranging through the target carrier (T-carrier).

The AMS may transmit the AAI_CM-IND message through the target carrier (T-carrier) at an action time specified by the AAI_CM-CMD message, or may transmit a BR or a CQI report through the target carrier (T-carrier), such that it can inform the ABS of successful carrier change at step S1414.

Some parameters of the AAI_CM-CMD message according to this embodiment of the present invention may be defined by the following Table 16.

TABLE 16

| Field | Size (bit) | Description |
|---|---|---|
| AAI_Carrier Management Command message format( ){ | | |
|   Management Message Type | 8 | AAI_CM-CMD |
|   Action code | 2 | 00: Secondary Carrier Management<br>01: Primary carrier change<br>10: Carrier Switching<br>11: Carrier Change |
|   ... | | |
|   If (Action code == 11){ | | This message is for carrier change of single carrier supported AMS |

TABLE 16-continued

| Field | Size (bit) | Description |
|---|---|---|
| Target carrier index | [TBD] | Target carrier index for carrier change (refer to physical carrier index) |
| Disconnection Time | [TBD] | LSB bits of Superframe number at the time to switch to the target carrier. AMS shall disconnect connection with serving carrier at this time. |
| Action Time | [TBD] | LSB bits of Superframe number at the time to switch to the target carrier. AMS shall transmit any confirm message to target carrier for successful carrier change at this time. |
| Ranging indicator | 1 | Ranging indicator for target carrier '0': No ranging is required for the target carrier '1': Periodic ranging is required for the target carrier |
| } | | |
| ... | | |

In accordance with one embodiment in which dedicated ranging is used when the action code of the AAI_CM-CMD message is defined as '11', the CDMA_RNG_FLAG field is contained in the AAI_CM-CMD message. In addition, if the CDMA_RNG_FLAG field is set to '1', the AAI_CM-CMD message may further include a dedicated CDMA ranging code/opportunity field. Some parameters of the AAI_CM-CMD message may be defined by the following Table 17.

TABLE 17

| Field | Size (bit) | Description |
|---|---|---|
| AAI_Carrier Management Command message format( ){ | | |
| Management Message Type | 8 | AAI_CM-CMD |
| Action code | 2 | 00: Secondary Carrier Management 01: Primary carrier change 10: Carrier Switching 11: Carrier Change |
| ... | | |
| If (Action code == 11){ | | This message is for carrier change of single carrier supported AMS |
| Target carrier index | [TBD] | Target carrier index for carrier change (refer to physical carrier index) |
| Disconnection Time | [TBD] | LSB bits of Superframe number at the time to switch to the target carrier. AMS shall disconnect connection with serving carrier at this time. |
| Action Time | [TBD] | LSB bits of Superframe number at the time to switch to the target carrier. AMS shall transmit any confirm message to target carrier for successful carrier change at this time. |
| CDMA_RNG_FLAG | 1 | CDMA Ranging flag for target carrier '0': No ranging is required for the target carrier '1': Dedicated ranging is required for the target carrier |
| If (CDMA_RNG_FLAG == 1){ Dedicated CDMA ranging code/opportunity } | [TBD] | These parameters may be included when CDMA_RNG_FLAG = 1 |
| } | | |
| ... | | |

Procedures depending on values of the above-mentioned CDMA_RNG_FLAG field according to one embodiment of the present invention will hereinafter be described with reference to FIGS. 14(*b*) and 14(*c*).

An exemplary carrier change procedure to be used when the CDMA_RNG-FLAG field is set to '0' according to one embodiment of the present invention will hereinafter be described with reference to FIG. 14(*b*). Referring to FIG. 14(*b*), the single carrier AMS can receive the AAI_CM-CMD message corresponding to the carrier change having an action code '11' from the ABS at step S1421. In the case of the action code '11', the AAI_CM-CMD message may include a target carrier index, a disconnection time, an action time, and a ranging indicator.

In reference to the single carrier AMS, the target carrier (T-carrier) specified by the AAI_CM-CMD message may represent a physical carrier index. The AMS may transmit the AAI_CM-IND message in response to the AAI_CM-CMD message at step S1422. However, in the case where the AAI_CM-IND message is used as a confirmation message for carrier change confirmation, the transmission of the AAI_CM-IND message through the serving carrier (S-carrier) may be omitted as necessary.

The disconnection time specified by the AAI_CM-CMD message may be set to any time after the sum of one time consumed for the AMS to decode the AAI_CM-CMD message and the other time consumed for transmission of the AAI_CM-IND message. At the disconnection time, the AMS severs the connection to the serving carrier (S-carrier) and may perform carrier change from the serving carrier (S-carrier) to the target carrier (T-carrier) at step S1423.

An action time specified by the AAI_CM-CMD message when the CDMA_RNG_FLAG field is set to '0' may be set to a predetermined period of time in which the carrier change to the target carrier (T-carrier) is successfully performed and then the AMS transmits a confirmation message (AAI_CM-IND, BR or CQI report) through the target carrier (T-carrier) at step S1424.

An exemplary carrier change procedure to be used when the CDMA_RNG-FLAG field is set to '1' according to one embodiment of the present invention will hereinafter be described with reference to FIG. 14(*c*). Steps S1431 and S1432 in FIG. 14(*c*) are substantially identical to steps S1421 and S1422 to the exclusion of the CDMA_RNG_FLAG value in FIG. 14(*b*).

The disconnection time specified by the AAI_CM-CMD message may be set to any time after the sum of one time consumed for the AMS to decode the AAI_CM-CMD message and the other time consumed for transmission of the AAI_CM-IND message. At the disconnection time, the AMS severs the connection to the serving carrier (S-carrier) and may perform synchronization and ranging through the target carrier (T-carrier) at step S1433.

An action time specified by the AAI_CM-CMD message when the CDMA_RNG_FLAG value is set to '1' may be set to a predetermined period of time in which the AMS transmits a CDMA ranging code through the target carrier (T-carrier) such that CDMA ranging can be performed through the target carrier (T-carrier) at step S1434. In this case, in order to establish synchronization with the target carrier (T-carrier) during the carrier change procedure after the disconnection time, ranging can be performed using the dedicated CDMA ranging code/opportunity field received from the AAI_CM-CMD message.

In this case, a field of a predetermined deadline (i.e., target carrier activation) to prepare for carrier change may be defined in the AAI_CM-CMD message. The carrier change readiness deadline may be set to a predetermined period of time from the beginning of the disconnection time to the end of T-carrier activation as necessary. Assuming that the CDMA ranging is successfully performed prior to the carrier change deadline, the AMS may transmit a confirmation message (AAI_CM-IND, BR or CQI report) through the target carrier (T-carrier) at step S1435. In the meantime, assuming that the CDMA ranging results in a failure prior to the carrier change deadline, the AMS and the ABS may restart the service through the serving carrier (S-carrier).

Hereinafter, a variety of embodiments illustrating carrier change of a single carrier supported AMS by means of a carrier management procedure will be described in detail.

The carrier change procedure of the single carrier supported AMS can be separately defined as follows.

For the purpose of load balancing, variable carrier channel quality or other factors, the ABS may command the AMS to change a current serving carrier (S-carrier) to one of the available fully configured carriers belonging to the ABS through the AAI_CM-CMD MAC control message of the current S-carrier. If the single carrier supported AMS receives the AAI_CM-CMD MAC control message in which an action code is set to '1', the AMS may transmit the AAI_CM-IND MAC control message prior to the action time.

After the lapse of the action time, the AMS may perform a hardware reset (e.g., RF center frequency), and may switch to the target carrier (T-carrier). If the CDMA_RNG-FLAG field of the AAI_CM-CMD message is set to '1', the AMS may perform dedicated ranging to the target carrier (T-carrier). Upon successful completion of dedicated ranging, the AMS transmits a bandwidth request (BR) indicating successful switching to the target carrier (T-carrier) to the ABS. If the AMS receives uplink data to be transmitted, a general bandwidth request (BR) procedure is performed. If the AMS does not have uplink data to be transmitted, a BR having the BR size of '0' may be transmitted. Upon receiving the BR from the AMS, the ABS may transmit a control signal and data through the target carrier (T-carrier). In the case where the common MAC manages both the serving carrier (S-carrier) and the target carrier (T-carrier), the network re-entry is not requested at the target carrier (T-carrier). Through the serving carrier (S-carrier), the ABS may provide system information of the target carrier (T-carrier) different from the serving carrier (S-carrier). The ABS may command the AMS to perform the primary carrier change without scanning.

The AAI_CM-CMD MAC control message for carrier change may include a T-carrier index (indicating a physical carrier index), an action time, CDMA_RNG-FLAG, and a dedicated CDMA ranging code/opportunity. In the case where the CDMA_RNG-FLAG field is set to '1', the dedicated CDMA ranging code/opportunity may be contained in the AAI_CM-CMD MAC control message.

In the meantime, a method for defining a new action code and controlling a single carrier AMS to perform a common MAC carrier change (handover) using the AAI_CM-CMD message according to an embodiment of the present invention will hereinafter be described. In the AAI_CM-CMD message, an action code that indicates a carrier change of the single carrier supported AMS may be set to '10'. In association with the action code '10', the AAI_CM-CMD message may further include a physical carrier index of a target carrier (T-carrier), an action time field, a CDMA_RNG-FLAG field, and a dedicated CDMA ranging code/opportunity field. Some parameters of the AAI_CM-CMD message can be defined by the following Table 18.

TABLE 18

| Field | Size (bit) | Description |
|---|---|---|
| AAI_Carrier Management Command message format( ){ | | |
| Control Message Type | 8 | AAI_CM-CMD |
| Action code | 2 | 00: Secondary carrier management<br>01: Primary carrier change<br>10: Carrier change for single carrier supported AMS<br>11: reserved |
| ... | | |
| If (Action code == 10){ | | This message is for carrier change for single carrier supportedAMS. |
| Physical carrier index of target carrier | [TBD] | Physical carrier index of target carrier |

TABLE 18-continued

| Field | Size (bit) | Description |
|---|---|---|
| Action Time | [TBD] | LSB bits of Superframe number at the time to switch to the target carrier. AMS shall disconnect connection with serving carrier at this time. |
| CDMA_RNG_FLAG | 1 | CDMA Ranging flag for target carrier '0': No ranging is required for the target carrier '1': Dedicated HO ranging is required for the target carrier |
| If (CDMA_RNG_FLAG == 1){    Dedicated CDMA ranging code/opportunity   } } ... | [TBD] | |

Next, one embodiment for supporting the carrier change of the single carrier AMS by defining a new indication type field in the AAI_CM-CMD message will hereinafter be described in detail.

In accordance with this embodiment of the present invention, an action code '1' indicating the primary carrier (P-carrier) change from among action codes of the AAI_CM-CMD message may be defined to represent 'carrier change'. Therefore, an indication type field for indicating the action code of 1 may be defined and 'P-Carrier Change/Carrier Change' fields depending on the AMS types (multi-carrier supported AMS: 0 and single carrier supported AMS: 1) may be respectively defined. For example, one case in which the AMS type is a single carrier supported AMS is set to an indication type '1', such that a physical carrier index of a target carrier (T-carrier), an action time field, a CDMA_RNG_FLAG field, and a dedicated CDMA ranging code/opportunity field can be newly defined. In this case, some parameters of the AAI_CM-CMD message can be defined by the following Table 19.

TABLE 19

| Field | Size (bit) | Description |
|---|---|---|
| AAI_Carrier Management Command message format( ){ | | |
| Control Message Type | 8 | AAI_CM-CMD |
| Action code | 1 | 0: Secondary carrier management<br>1: Primary cCarrier change |
| If (Action code == 1){ | | This message is for primary carrier change. |
| Indication Type | 1 | For AMS type<br>0: Primary carrier change for multi-carrier supported AMS<br>1: Carrier change for single carrier supported AMS |
| If(Indication Type == 0){ | | This message is for primary carrier change for multi-carrier supported AMS. |
|   Target carrier index | [TBD] | Target carrier index for primary carrier change |
|   Action Time | [TBD] | LSB bits of Superframe number at the time to switch to the target carrier. |
|   Next state of serving primary carrier | 1 | '0': Serving carrier will be deactivated after primary carrier change<br>'1': Serving carrier is kept active after primary carrier change |
| } | | |
| If(Indication Type == 1){ | | This message is for carrier change for single carrier supported AMS. |
|   Physical carrier index of target carrier | [TBD] | Physical carrier index of target carrier |
|   Action Time | [TBD] | LSB bits of Superframe number at the time to switch to the target carrier.<br>AMS shall disconnect connection with serving carrier at this time. |
|   CDMA_RNG_FLAG | 1 | CDMA Ranging flag for target carrier<br>'0': No ranging is required for the target carrier<br>'1': Dedicated HO ranging is required for the target carrier |
|   If (CDMA_RNG_FLAG == 1){<br>    Dedicated CDMA ranging code/opportunity<br>    }<br>  }<br>... | [TBD] | |

In reference to the indication types '0' and '1' for use in the above-mentioned case of the action code '1', a target carrier index field and an action time field are shared. In reference to the indication type '0' (indicating a multi-carrier supported AMS), the next status field (Next State of Serving Primary Carrier) is defined. In reference to the indication type '1' (indicating a single carrier supported AMS), the CDMA_RNG_FLAG field and the dedicated CDMA ranging code/opportunity field may be defined. In this case, some parameters of the AAI_CM-CMD message can be defined by the following Table 20.

TABLE 20

| Field | Size (bit) | Description |
|---|---|---|
| AAI_Carrier Management Command message format( ){ | | |
| Control Message Type | 8 | AAI_CM-CMD |
| Action code | 1 | 0: Secondary carrier management |
| | | 1: Primary cCarrier change |
| ... | | |
| If (Action code == 1){ | | This message is for primary carrier change. |
| Target carrier index | [TBD] | Target carrier index for primary carrier change |
| Action Time | [TBD] | LSB bits of Superframe number at the time to switch to the target carrier. |
| Indication Type | 1 | For AMS type |
| | | 0: Primary carrier change for multi-carrier supported AMS |
| | | 1: Carrier change for single carrier supported AMS |
| If(Indication Type == 0){ | | This message is for primary carrier change for multi-carrier supported AMS. |
| Next state of serving primary carrier | 1 | '0': Serving carrier will be deactivated after primary carrier change |
| | | '1': Serving carrier is kept active after primary carrier change |
| } | | |
| If(Indication Type == 1){ | | This message is for carrier change for single carrier supported AMS. |
| CDMA_RNG_FLAG | 1 | CDMA Ranging flag for target carrier |
| | | '0': No ranging is required for the target carrier |
| | | '1': Dedicated HO ranging is required for the target carrier |
| If (CDMA_RNG_FLAG == 1){ Dedicated CDMA ranging code/opportunity } | [TBD] | |
| } | | |
| ... | | |

In the above-mentioned embodiments, the periodic ranging instead of the dedicated CDMA ranging may be carried out, and the action time may be set to a value higher than that of a retransmission time of the AAI_CM-CMD message.

Next, a network entry procedure for use in a multi-carrier operation according to one embodiment of the present invention will hereinafter be described in detail.

As previously stated above, the network entry in a multi-carrier mode is basically identical to that of the single-carrier mode, and the support of the multi-carrier mode can be displayed during the registration procedure of the ABS and the AMS. During the initial network entry, the AMS transmits an advanced air interface registration request (AAI_REG-REQ) message to the ABS such that the AMS can inform the ABS that the AMS supports multi-carrier transmission. The ABS can indicate whether there is a supported one among multi-carrier modes of the AMS through an advanced air interface registration response (AAI_REG-RSP) message. In reference to multi-carrier capability of the ABS and the AMS, it is assumed that the ABS and the AMS do not support the multi-carrier (MC) mode (i.e., the ABS and the AMS have no MC modes). This assumption may correspond to an exemplary case in which a 2-bit code of the advanced air interface registration request/response (AAI_REG_REQ/RSP) message is set to '00'. In this case, the AMS initialization operation for use in the network entry procedure will hereinafter be described with reference to FIG. 15.

Figure 15:
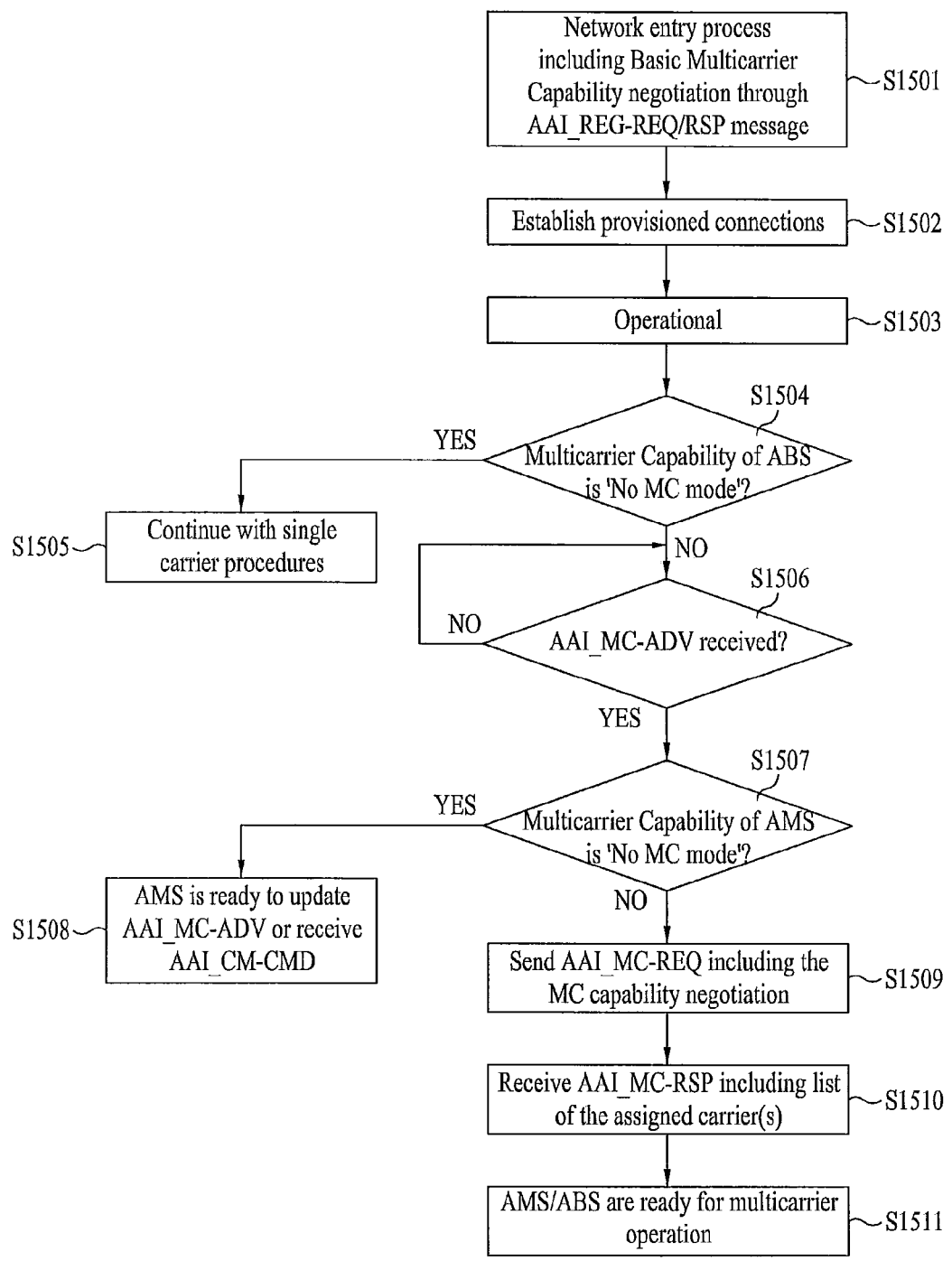
FIG. 15 is a flowchart illustrating an MS initialization action for use in a network entry process according to one embodiment of the present invention.

Referring to FIG. 15, the embodiment of the present invention can determine whether the ABS has the capability of no MC mode at step S1504 after performing the network entry step S1501, the provisioned connection establishment step S1502, and the operation step S1503, whereas the conventional AMS initialization operation determines whether the ABS and the AMS support the common MC mode after performing the network entry step S1501, the provisioned connection establishment step S1502, and the operation step S1503. If the ABS has the capability of no MC mode, the AMS initialization may be performed according to the procedure defined in a single carrier at step S1505. If the ABS has multi-carrier (MC) capability (e.g., multi-carrier (MC) aggregation mode, multi-carrier (MC) switching mode, etc.) other than no MC mode, it is determined whether the AMS receives a multi-carrier advertisement (AAI_MC-ADV) message from the ABS at step S1506. If the AMS has received the AAI_MC-ADV message from the ABS at step S1506, it is determined whether the multi-carrier capability of the AMS is 'no MC mode' at step S1507.

Although the AMS has no MC mode, the AMS receives and interprets the multi-carrier MAC control message as previously described in the embodiment of the present invention, such that it can carry out the common MAC handover (HO) procedure. In other words, the AMS of no MC mode receives the AAI_MC-ADV message, such that it is ready to update MC information provided from the ABS or receive the carrier management command (AAI_CM-CMD) message at step S1508. On the other hand, in the case where the AMS has MC capability (e.g., multi-carrier (MC) aggregation mode, multi-carrier (MC) switching mode, etc.) other than no MC mode, the AMS and the ABS are ready for a multi-carrier (MC) operation through transmission/reception of the AAI_MC-REQ/RSP messages at steps S1509 to S1511.

Otherwise, as previously described in Table 1, a basic MC mode from among the MC capability is defined and the single carrier AMS receives and interprets the MC MAC message, such that the single carrier AMS is able to perform the common MAC handover (HO). The basic MC mode means that the AMS is able to be aware of the MC operation (including the primary carrier change and the support of MC operation associated optimization scanning) of the ABS. In this case, the AMS initialization operation will hereinafter be described with reference to FIG. 16.

Figure 16:
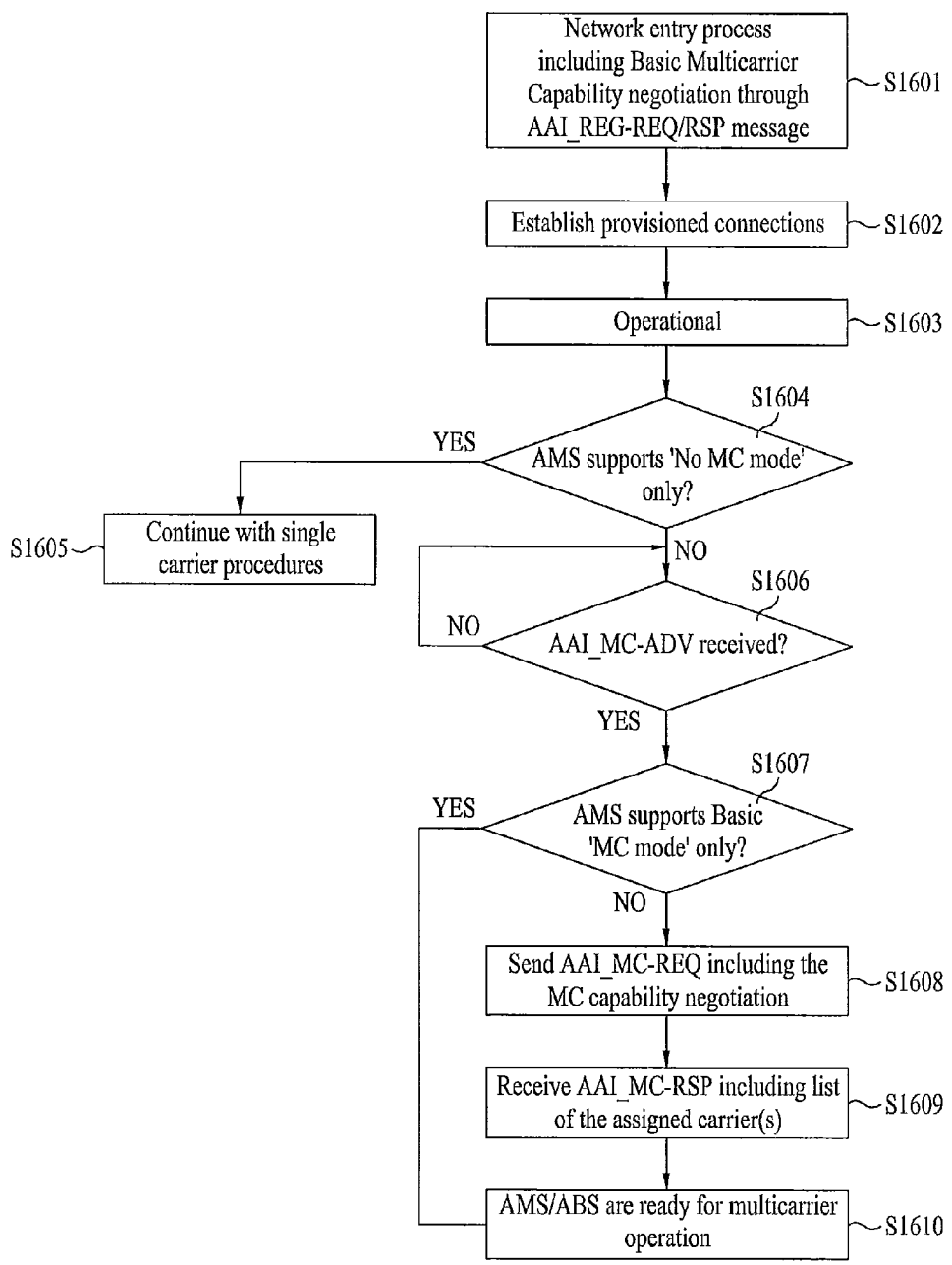
FIG. 16 is a flowchart illustrating an MS initialization action for use in a network entry process according to another embodiment of the present invention.

Steps S1601 to S1606 of FIG. 16 are identical to steps S1501 to A1506 of FIG. 15, and as such identical parts will herein be omitted for convenience of description. Upon receiving the AAI_MC-ADV message from the ABS, it can be determined whether the AMS supports the basic MC mode at step S1607. If the AMS supports the basic MC mode, the AMS can be aware of the MC operation of the ABS, such that the AMS and the ABS are ready for the MC operation without additional operations at step S1610. If the AMS receives MC capability other than the basic MC mode, the AMS and the ABS are ready for the MC operation through transmission/reception of the AAI_MC-REQ/RSP message at steps S1608 to S1610.

Next, one embodiment associated with the primary carrier change in the case of using the AMS that is operated in the carrier aggregation mode will hereinafter be described in detail.

In accordance with the conventional primary carrier change procedure, if a target carrier (T-carrier) is one of deactivated carriers, the AMS of the carrier aggregation mode has to perform the primary carrier change after severing the connection to the serving carrier (S-carrier), and has to inform the ABS of T-carrier readiness by transmitting a BR or the like to the ABS.

However, as previously stated in the above description, the currently defined carrier aggregation means an MC mode in which the AMS maintains the connection to a physical layer, monitors control signaling on a primary carrier, and at the same time processes data on the secondary carrier. The range of allocating resources to the AMS may cover a primary carrier and a plurality of secondary carriers. A link adaptation feedback mechanism includes measurement related to both the primary carrier and the secondary carrier. In the MC aggregation mode, according to system load (i.e., static/dynamic load balancing), peak data rate, or a QoS request, the system may asymmetrically allocate secondary carriers to the AMS via downlink and/or uplink.

In this way, the carrier aggregation mode AMS can maintain the physical layer connection through one or more carriers. Therefore, although the target carrier (T-carrier) is one of the deactivated carriers, the AMS need not sever the connection to the serving primary carrier (S-PC) at an action time in order to achieve the primary carrier change. The ABS may first activate a deactivated target carrier (T-carrier) prior to the execution of the primary carrier change.

Therefore, in reference to the primary carrier change, the following procedures may also be used. If the AMS is in the carrier aggregation mode, the target carrier (T-carrier) may be one of the fully configured carriers, and the AMS may receive data and a control signal through the target carrier (T-carrier) immediately after performing the switching at an action time specified by the ABS. If the target carrier (T-carrier) is one of the deactivated secondary carriers, the ABS may transmit the AAI_CM-CMD message associated with the primary carrier change to the AMS after activating the target carrier (T-carrier).

Figure 17:
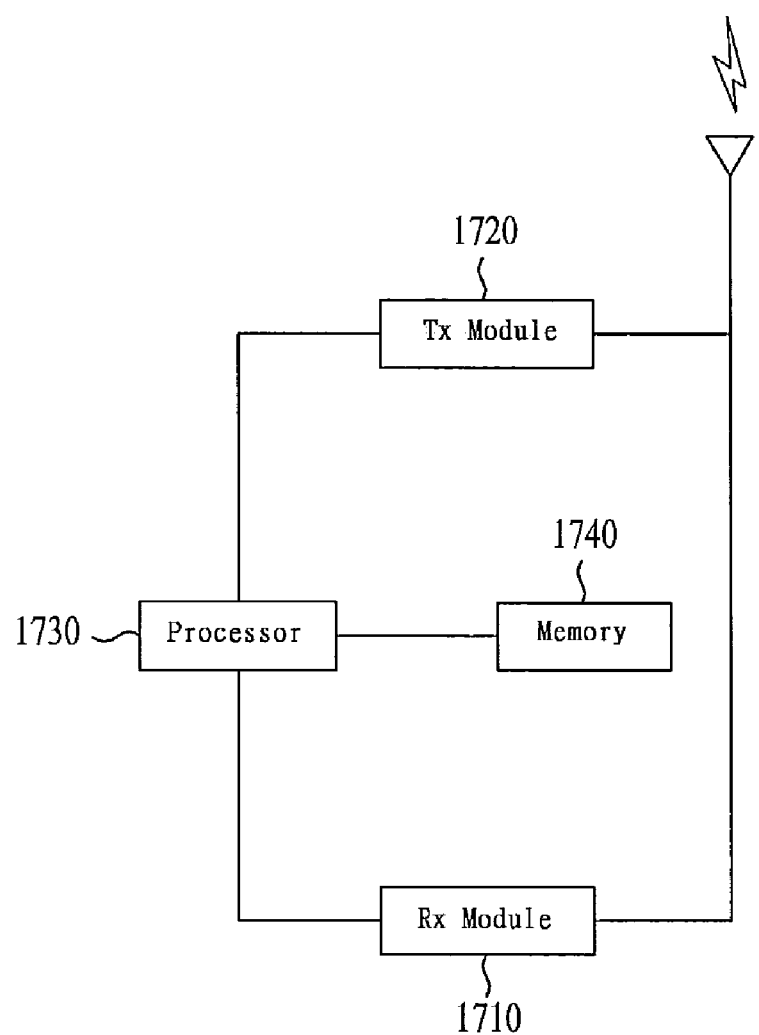
FIG. 17 illustrates functional blocks of a mobile station (MS) according to one embodiment of the present invention.

FIG. 17 is a block diagram illustrating an Advanced Mobile Station (AMS) according to the present invention.

Referring to FIG. 17, the AMS may include a reception (Rx) module 1710, a transmission (Tx) module 1720, a processor 1730, and a memory 1740. The Rx module 1710 may receive various signals, data, information, etc. from an external part such as an Advanced Base Station (ABS). The Tx module 1720 may transmit various signals, data, information, etc. to the ABS or the like.

The processor 1730 may receive an action code for indicating primary carrier change and an advanced air interface carrier management command (AAI_CM-CMD) message from the ABS through the reception (Rx) module 1710. The processor 1730 may transmit the AAI_CM-IND message for indicating the readiness of signal transmission/reception through a target carrier (T-carrier) specified by the AAI_CM-CMD message to a serving primary carrier (S-PC) of the ABS through the transmission (Tx) module 1720. The processor 1730 may control the AMS to perform the primary carrier switching to the target carrier (T-carrier), and may be set to a specific value that is higher than that of a retransmission timer of the AAI_CM-CMD message. The retransmission timer may be set to a specific time during which the ABS waits for receiving an acknowledgement (ACK) message indicating that the AAI_CM-CMD message was successfully received in the AMS.

In addition, the processor 1730 may receive an AAI_CM-CMD message, that includes not only an action code indicating secondary carrier management but also an indication type indicating deactivation, from the ABS through the reception (Rx) module 1710. The processor 1730 may transmit a response message to the AAI_CM-CMD message to the ABS through the transmission (Tx) module 1720. At a disconnection time determined by the AAI_CM-CMD message, the processor 1730 may deactivate at least one target carrier (T-carrier) specified to be deactivated by the AAI_CM-CMD message.

The processor 1730 may arithmetically perform processing of information received in the AMS, information to be transmitted externally, and the like. The memory 1740 may store arithmetically-processed information for a predetermined time, and be replaced with any other constituent element such as a buffer (not shown).

Figure 18:
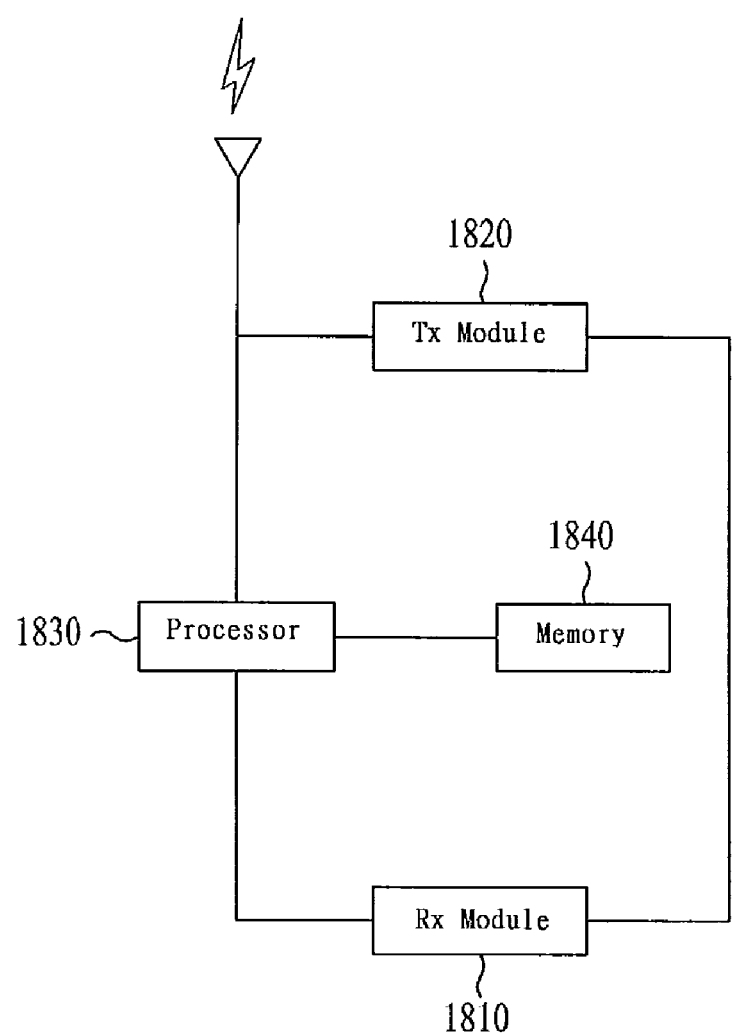
FIG. 18 illustrates functional blocks of a base station (BS) according to another embodiment of the present invention.

FIG. 18 is a block diagram illustrating an ABS according to the present invention.

Referring to FIG. 18, the ABS may include a reception (Rx) module 1810, a transmission (Tx) module 1820, a processor 1830, and a memory 1840. The Rx module 1810 may receive various signals, data, information, etc. from an external part such as an AMS. The Tx module 1820 may transmit various signals, data, information, etc. to the AMS or the like.

The processor 1830 may transmit an action code for indicating primary carrier change and an advanced air interface carrier management command (AAI_CM-CMD) message to the AMS through the transmission (Tx) module 1820. Through the reception (Rx) module 1810, the processor 1830 may receive the AAI_CM-IND message for indicating the readiness of signal transmission/reception through a target carrier (T-carrier) specified by the AAI_CM-CMD message from the AMS through a serving primary carrier (S-PC). The primary carrier is switched to the target carrier (T-carrier) at an action time, and a value of the action time may be set to a specific value that is higher than that of the retransmission timer of the AAI_CM-CMD message. The retransmission timer may be set to a specific time during which the ABS waits for receiving an acknowledgement (ACK) message indicating that the AAI_CM-CMD message was successfully received in the AMS.

In addition, the processor 1830 may transmit an AAI_CM-CMD message, that includes not only an action code indicating secondary carrier management but also an indication type indicating deactivation, to the AMS through the transmission (Tx) module 1820. The processor 1830 may receive a response message to the AAI_CM-CMD message from the AMS through the reception (Rx) module 1810. At a disconnection time decided by the AAI_CM-CMD message, the processor 1830 may deactivate at least one target carrier (T-carrier) specified to be deactivated by the AAI_CM-CMD message.

The processor 1830 may arithmetically perform processing of information received in the base station, information to be transmitted externally, and the like. The memory 1840 may store arithmetically-processed information for a predetermined time, and be replaced with any other constituent element such as a buffer (not shown).

Exemplary embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the exemplary embodiments of the present invention may be implemented in the form of a module, a procedure, a function, etc. performing the above-described functions or operations. Software code may be stored in a memory unit and executed by a processor. The memory unit is located at the interior or exterior of the processor and may transmit and receive data to and from the processor via various known means.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

The exemplary embodiments of the present invention are applicable to various wireless access systems. The exemplary embodiments of the present invention have the following effects. In association with a carrier management procedure for use in a multi-carrier supported wireless communication system, the embodiment of the present invention provides a method for effectively transmitting a carrier management message and a method for effectively performing carrier management. In association with a multi-carrier supported wireless communication system, the embodiment of the present invention provides an effective carrier change method of a single-carrier supported MS.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for a mobile station to perform a carrier management procedure with a base station supporting multiple carriers, the method comprising:
   receiving a carrier management command message including an action code indicating a primary carrier change and an action time, on a serving primary carrier of the base station;
   transmitting an acknowledgement message indicating that the carrier management command message is successfully received in the mobile station, on the serving primary carrier of the base station; and
   switching the primary carrier to a target carrier indicated by the carrier management command message at the action time,
   wherein the action time is set to a value more than a retransmission timer, the retransmission timer is set to a time during which the base station waits for receiving the acknowledgement message in response to the carrier management command message.

2. The method according to claim 1, further comprising:
   disconnecting communication of a control signal on the serving primary carrier at the action time.

3. A method for a mobile station to perform a carrier management procedure with a base station supporting multiple carriers, the method comprising:
   receiving a carrier management command message including an action code indicating secondary carrier management and an indication type indicating deactivation from the base station;
   transmitting a response message in response to the carrier management command message to the base station; and
   deactivating at least one target carrier specified to be deactivated by the carrier management command message, at a disconnection time decided by the carrier management command message.

4. The method according to claim 3,
   wherein the carrier management command message includes a disconnection time at which the at least one target carrier is deactivated.

5. The method according to claim 4,
   wherein the disconnection time is provided as the same value to the at least one target carrier.

6. The method according to claim 4,
wherein the disconnection time is provided to each of the at least one target carrier.

7. The method according to claim 3,
wherein, when the indication type additionally indicates activation of carriers other than the at least one target carrier, the carrier management command message includes a disconnection time defining a time point at which the at least one target carrier is deactivated, and
wherein the response message in response to the carrier management command message is a carrier management indication message transmitted to the base station when data transmission/reception through the activated carrier is ready.

8. The method according to claim 3,
wherein the carrier management command message further includes a disconnection time flag indicating whether a disconnection time is set, the disconnection time defining a time point at which the at least one target carrier is deactivated.

9. The method according to claim 8,
wherein the disconnection time flag is configured to set the disconnection time when the indication type further indicates activation of carriers other than the at least one target carrier.

10. The method according to claim 3,
wherein the disconnection time is determined to be a time point at which the carrier management command message is received.

11. A method for a base station supporting multiple carriers to perform carrier management procedure with a mobile station, the method comprising:
transmitting a carrier management command message including an action code indicating a primary carrier change and an action time, to the mobile station on a serving primary carrier;
receiving an acknowledgement message indicating that the carrier management command message is successfully received in the mobile station, from the mobile station on the serving primary carrier; and
switching the primary carrier to a target carrier indicated by the carrier management command message at the action time,
wherein the action time is set to a value more than a retransmission timer, the retransmission timer is set to a time during which the base station waits for receiving the acknowledgement message in response to the carrier management command message.

12. The method according to claim 11, further comprising:
disconnecting communication of a control signal on the serving primary carrier at the action time.

13. A method for a base station supporting multiple carriers to perform a carrier management procedure with a mobile station, the method comprising:
transmitting a carrier management command message including an action code indicating secondary carrier management and an indication type indicating deactivation, to the mobile station; and
receiving a response message in response to the carrier management command message from the mobile station,
wherein at least one target carrier specified to be deactivated by the carrier management command message is deactivated at a disconnection time decided by the carrier management command message.

14. The method according to claim 13,
wherein the carrier management command message includes a disconnection time at which the at least one target carrier is deactivated.

15. The method according to claim 14,
wherein the disconnection time is provided as the same value to the at least one target carrier.

16. The carrier management method according to claim 14,
wherein the disconnection time is provided to each of the at least one target carrier.

17. The method according to claim 13,
wherein, when the indication type additionally indicates activation of carriers other than the at least one target carrier, the carrier management command message includes a disconnection time defining a time point at which the at least one target carrier is deactivated, and
wherein the response message in response to the carrier management command message is a carrier management indication message received from the mobile station when data transmission/reception through the activated carrier is ready.

18. The method according to claim 13,
wherein the carrier management command message further includes a disconnection time flag indicating whether a disconnection time is set, the disconnection time defining a time point at which the at least one target carrier is deactivated.

19. The method according to claim 18,
wherein the disconnection time flag is configured to set the disconnection time when the indication type further indicates activation of carriers other than the at least one target carrier.

20. The carrier management method according to claim 13,
wherein the disconnection time is determined to be a time point at which the carrier management command message is received by the mobile terminal.

21. A mobile station for performing a carrier management procedure with a base station supporting multiple carriers, the mobile station comprising:
a reception module for receiving a downlink control signal and downlink data from the base station;
a transmission module for transmitting a uplink control signal and uplink data to the base station; and
a processor connected to the reception module and the transmission module for controlling the mobile station including the reception module and the transmission module,
wherein the processor is configured to:
control the reception module to receive a carrier management command message including an action code indicating a primary carrier change and an action time, from the base station on a serving primary carrier,
control the transmission module to transmit an acknowledgement message indicating that the carrier management command message is successfully received in the mobile station, on the serving primary carrier of the base station; and
control the mobile station to switch the primary carrier to the target carrier at the action time,
wherein the action time is set to a value more than a retransmission timer, the retransmission timer is set to a time during which the base station waits for receiving the acknowledgement message in response to the carrier management command message.

22. A base station supporting multiple carriers to perform a carrier management procedure with a mobile station, the base station comprising:
- a reception module for receiving a uplink control signal and uplink data from the mobile station;
- a transmission module for transmitting a downlink control signal and downlink data to the mobile station; and
- a processor connected to the reception module and the transmission module for controlling the base station including the reception module and the transmission module,
- wherein the processor is configured to:
  - control the transmission module to transmit carrier management command message including an action code indicating a primary carrier change and an action time, to the mobile station on a serving primary carrier,
  - control the reception module to receive an acknowledgement message indicating that the carrier management command message is successfully received in the mobile station, from the mobile station on the serving primary carrier, and
- wherein the primary carrier is switched to a target carrier indicated by the carrier management command message at the action time,
  - wherein the action time is set to a value more than a retransmission timer, the retransmission timer is set to a time during which the base station waits for receiving the acknowledgement message in response to the carrier management command message.

23. A mobile station for performing a carrier management procedure with a base station supporting multiple carriers, the mobile station comprising:
- a reception module for receiving a downlink control signal and downlink data from the base station;
- a transmission module for transmitting a uplink control signal and uplink data to the base station; and
- a processor connected to the reception module and the transmission module for controlling the mobile station including the reception module and the transmission module,
- wherein the processor is configured to:
  - control the reception module to receive a carrier management command message including an action code indicating secondary carrier management and an indication type indicating deactivation, from the base station,
  - control the transmission module to transmit a response message in response to the carrier management command message to the base station, and
  - control the mobile terminal to deactivate at least one target carrier specified to be deactivated by the carrier management command message, at a disconnection time decided by the carrier management command message.

24. A base station supporting multiple carriers to perform a carrier management procedure with a mobile station, the base station comprising:
- a reception module for receiving a uplink control signal and uplink data from the mobile station;
- a transmission module for transmitting a downlink control signal and downlink data to the mobile station; and
- a processor connected to the reception module and the transmission module for controlling the base station including the reception module and the transmission module,
- wherein the processor is configured to:
  - control the transmission module to transmit a carrier management command message including an action code indicating secondary carrier management and an indication type indicating deactivation, to the mobile station, and
  - control the reception module to receive a response message in response to the carrier management command message from the mobile station,
- wherein at least one target carrier specified to be deactivated by the carrier management command message is deactivated at a disconnection time decided by the carrier management command message.

* * * * *